US008648979B2

(12) United States Patent
Kuromizu

(10) Patent No.: US 8,648,979 B2
(45) Date of Patent: Feb. 11, 2014

(54) LIGHTING DEVICE, DISPLAY DEVICE AND TELEVISION RECEIVER

(75) Inventor: Yasumori Kuromizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 155 days.

(21) Appl. No.: 13/375,549

(22) PCT Filed: Apr. 6, 2010

(86) PCT No.: PCT/JP2010/056204
§ 371 (c)(1),
(2), (4) Date: Dec. 1, 2011

(87) PCT Pub. No.: WO2010/146913
PCT Pub. Date: Dec. 23, 2010

(65) Prior Publication Data
US 2012/0075550 A1 Mar. 29, 2012

(30) Foreign Application Priority Data
Jun. 15, 2009 (JP) .................................. 2009-142445

(51) Int. Cl.
G02F 1/1333 (2006.01)
(52) U.S. Cl.
USPC .............. 349/58; 349/65; 362/97.1; 362/97.4
(58) Field of Classification Search
USPC ........... 349/58, 61, 62, 65, 60, 67, 64, 57, 95;
362/97.1, 97.2, 382, 249.01, 235, 97.4,
362/612, 631, 632, 633, 634
See application file for complete search history.

(56) References Cited

U.S. PATENT DOCUMENTS

| 7,246,931 | B2 * | 7/2007 | Hsieh et al. ................... 362/612 |
| 7,604,390 | B2 * | 10/2009 | Zhang et al. .................. 362/634 |
| 2008/0094830 | A1 | 4/2008 | Chang |
| 2009/0135330 | A1 | 5/2009 | Kawase et al. |
| 2009/0154139 | A1 * | 6/2009 | Shin ............................. 362/97.1 |

FOREIGN PATENT DOCUMENTS

| CN | 101165566 A | 4/2008 |
| JP | 2002-184510 A | 6/2002 |
| JP | 2006-276761 A | 10/2006 |
| JP | 2007-317423 A | 12/2007 |

(Continued)

OTHER PUBLICATIONS

Official Communication issued in International Patent Application No. PCT/JP2010/056204, mailed on Jul. 13, 2010.

(Continued)

*Primary Examiner* — Thoi Duong
(74) *Attorney, Agent, or Firm* — Keating & Bennett, LLP

(57) ABSTRACT

An object of the present invention is to reduce the tendency that local deformation occurs in an extending member in a backlight unit. A backlight unit 12 of the present invention includes LEDs 17 as light sources, a chassis 14 that stores the LEDs 17, a reflection sheet 21 and an LED substrate 18 as extending members extending along an inner surface of the chassis 14 and a holding member 20 that holds the reflection sheet 21 and the LED substrate 18 with the chassis 14 such that the reflection sheet 21 and the LED substrate 18 are sandwiched between the holding member 20 and the chassis 14. The holding member 20 is fixed to the chassis 14. The holding member 20 includes contact portions 26 that protrude toward the reflection sheet 21 and the LED substrate 18. The contact portions 26 are in contact with the reflection sheet 21 and the LED substrate 18.

31 Claims, 33 Drawing Sheets

(56) References Cited

FOREIGN PATENT DOCUMENTS

| | | |
|---|---|---|
| JP | 2007-322697 A | 12/2007 |
| JP | 2008-198398 A | 8/2008 |
| JP | 2009-129707 A | 6/2009 |
| WO | 2009/002081 A2 * | 12/2008 |

OTHER PUBLICATIONS

Kuromizu, "Lighting Device, Display Device and Television Receiver", U.S. Appl. No. 13/375,552, filed Dec. 1, 2011.

Yoshikawa, "Lighting Device, Display Device and Television Receiver", U.S. Appl. No. 13/375,547, filed Dec. 1, 2011.

* cited by examiner

FIG.1
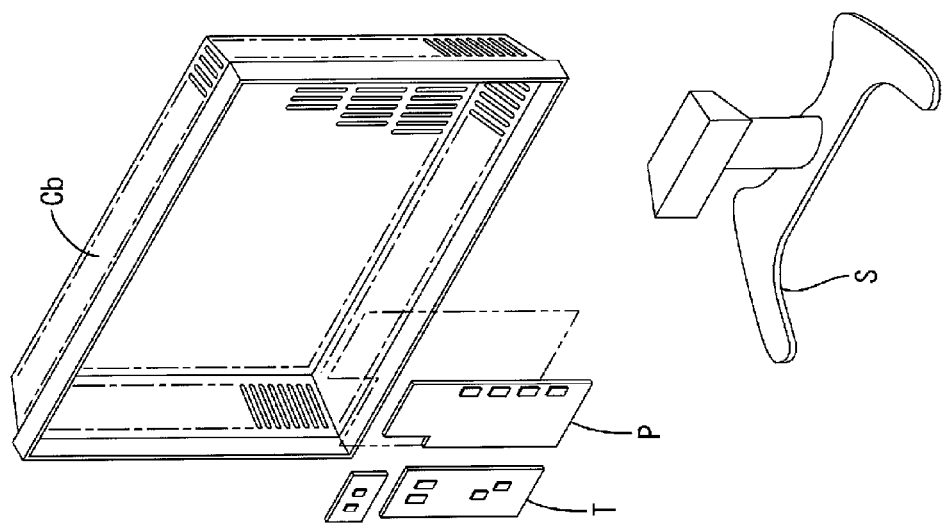
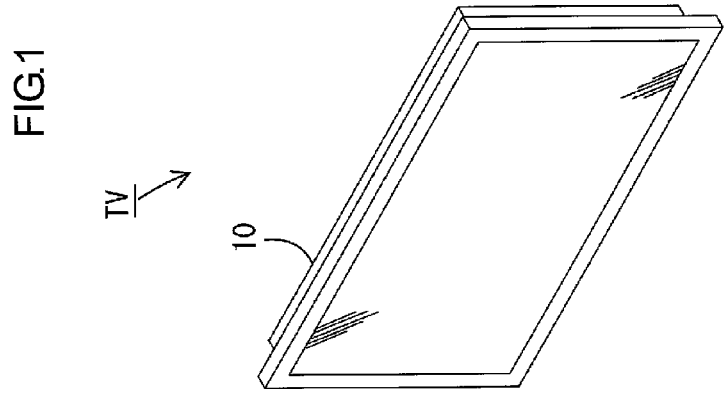
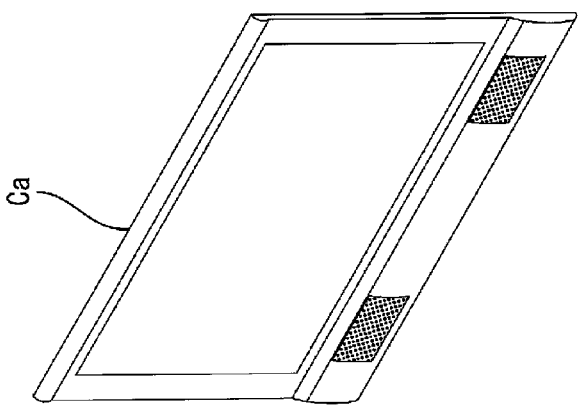

FIG.2
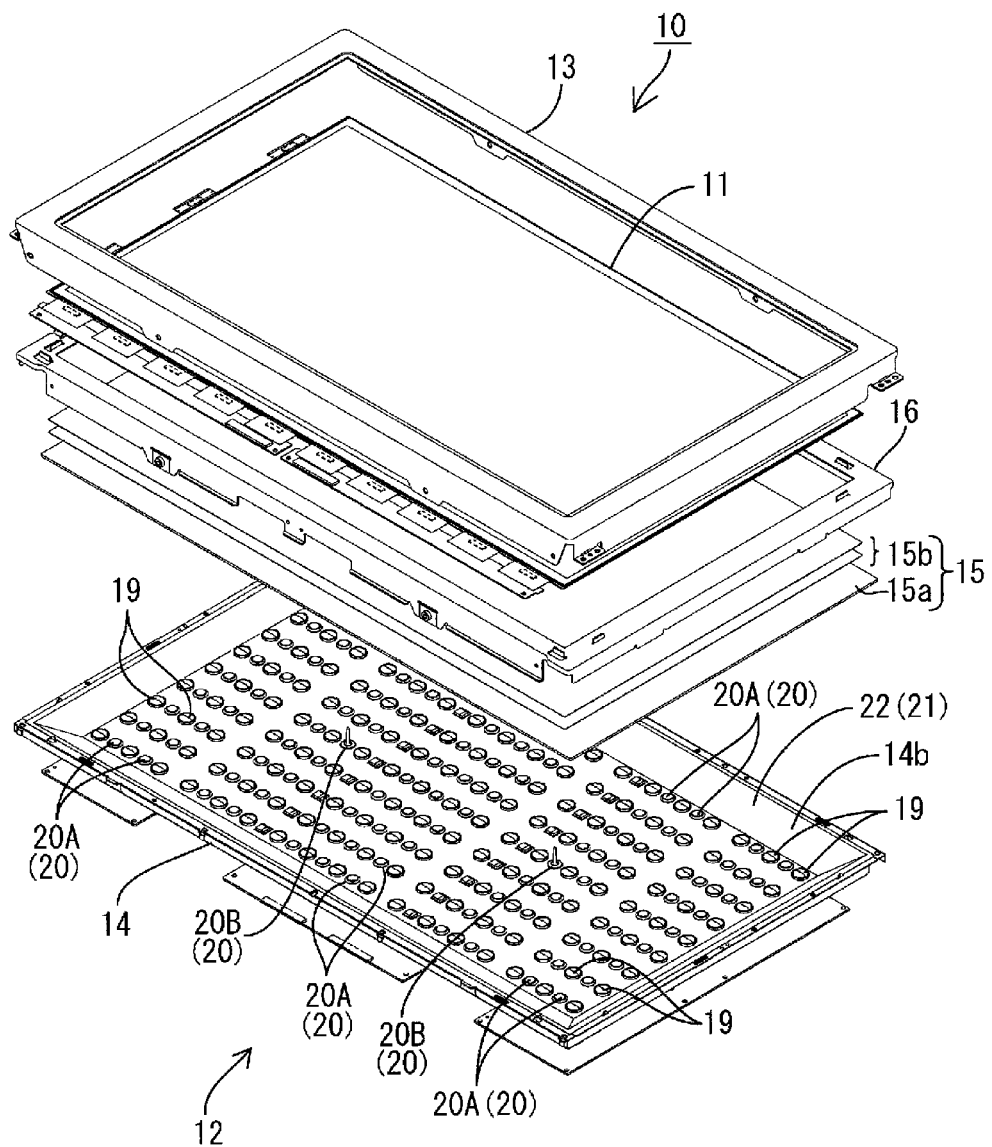
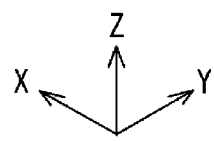

FIG.21
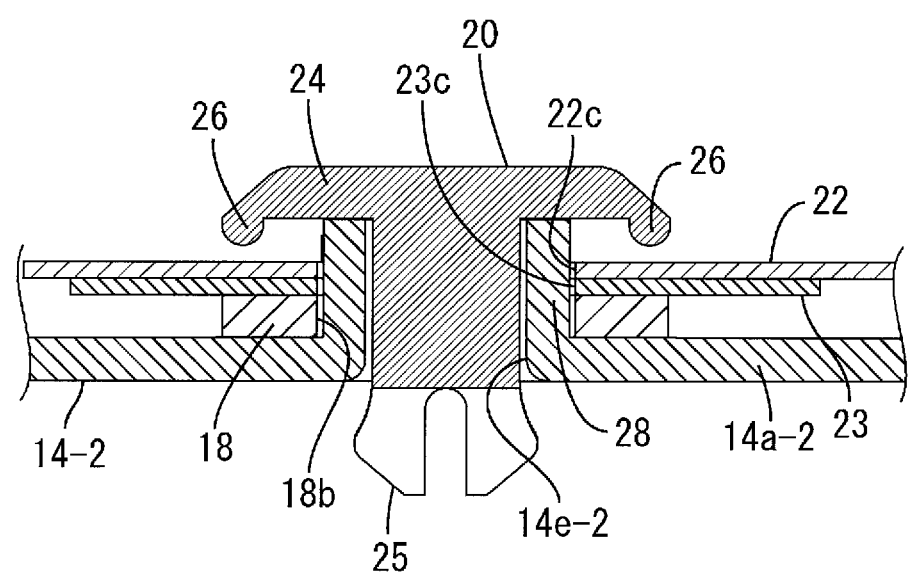
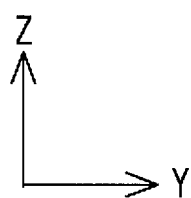

FIG.23
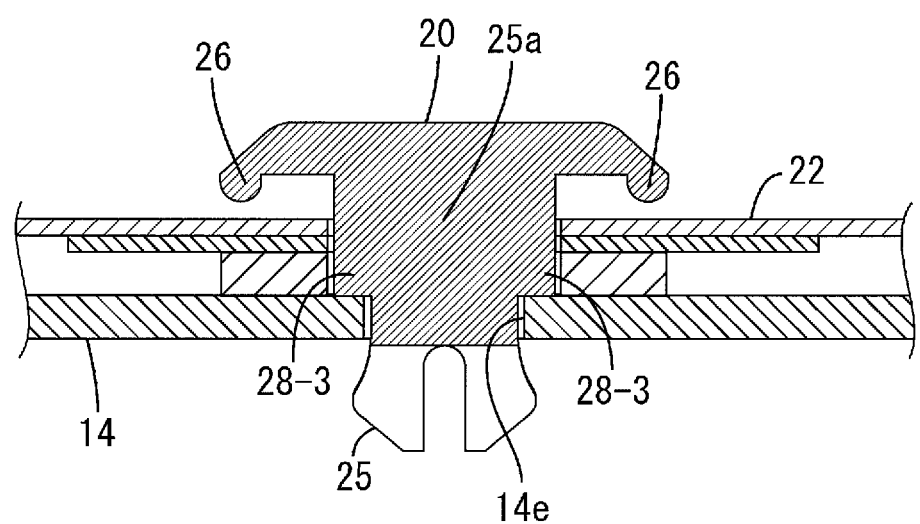
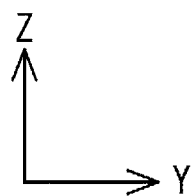

FIG.26
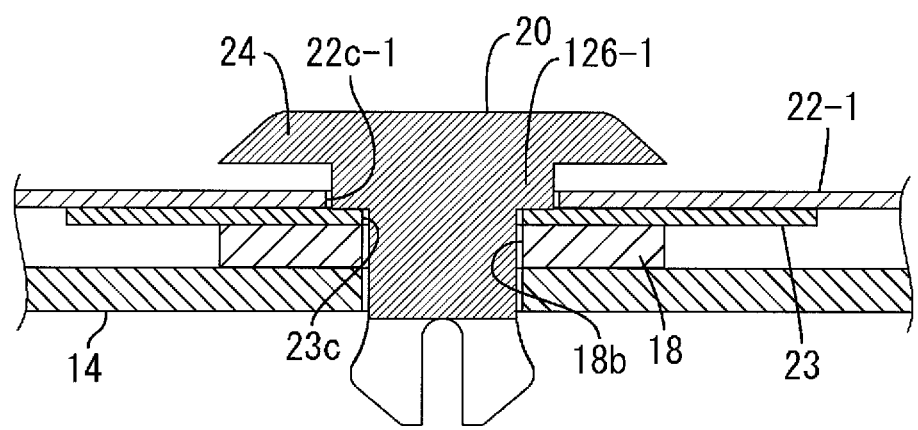
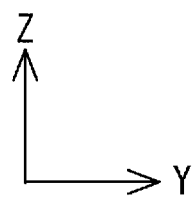

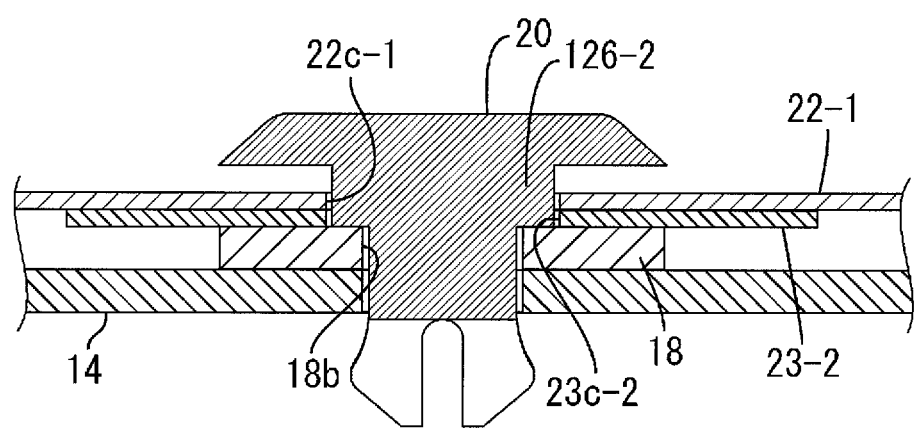
FIG.27
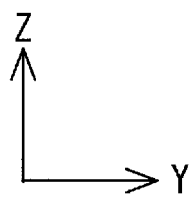

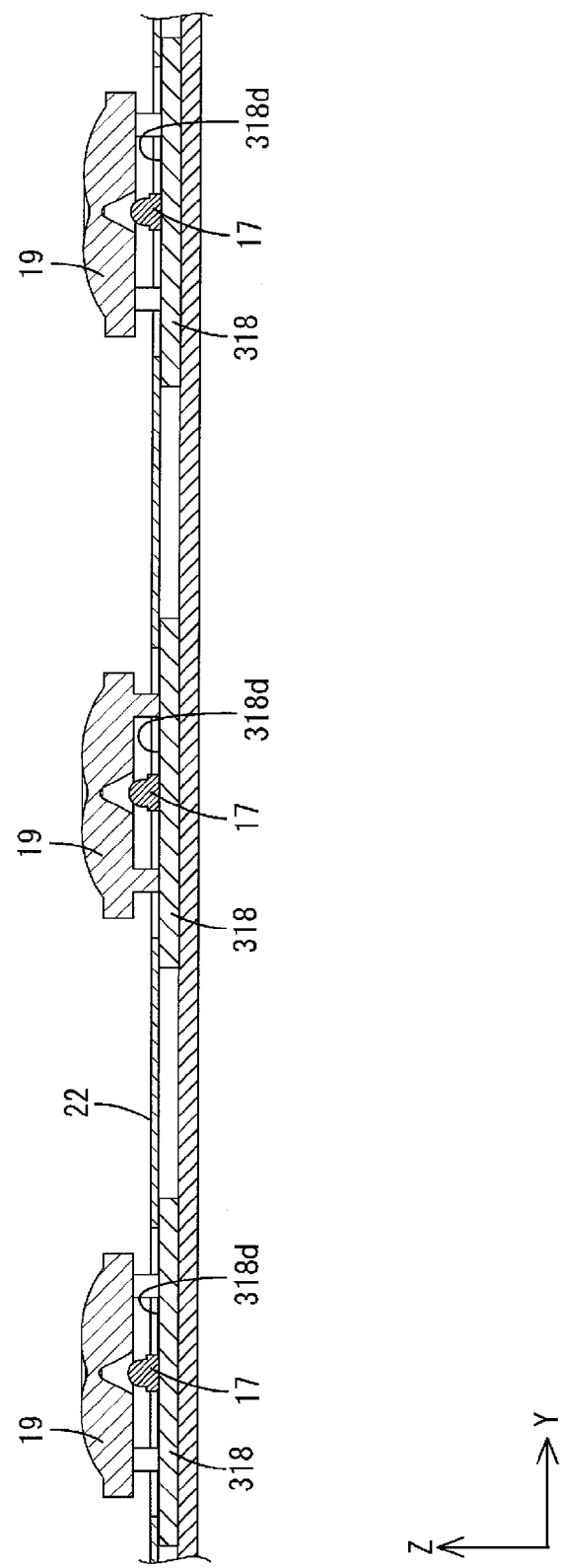

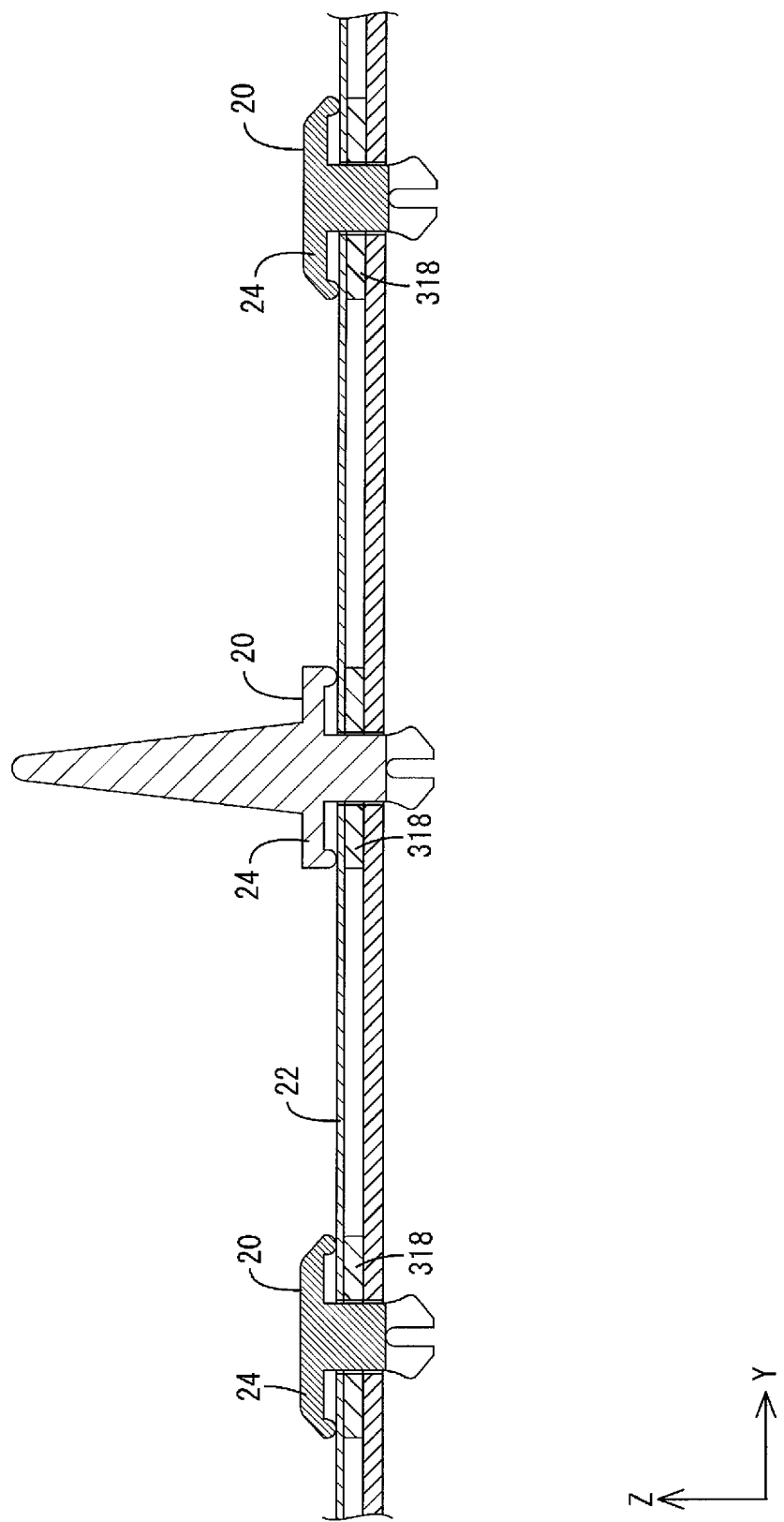

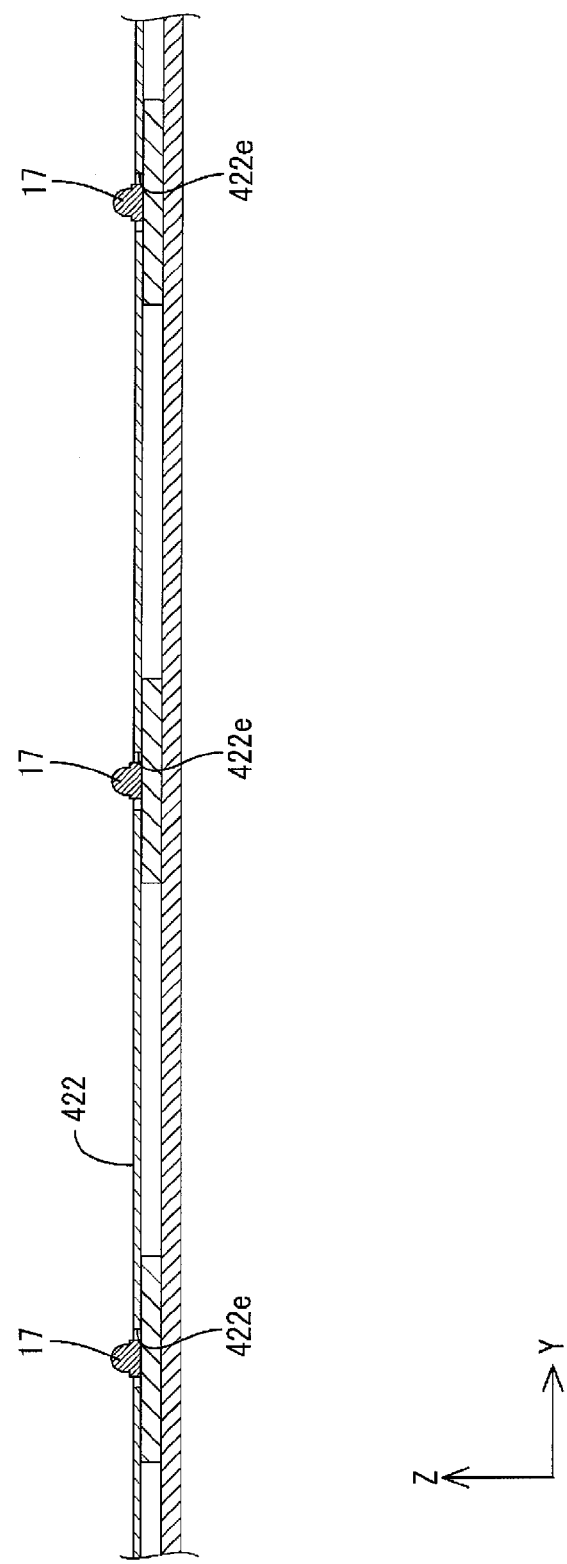

LIGHTING DEVICE, DISPLAY DEVICE AND TELEVISION RECEIVER

TECHNICAL FIELD

The present invention relates to a lighting device, a display device and a television receiver.

BACKGROUND ART

For example, a liquid crystal panel used for a liquid crystal display device such as a liquid crystal television set does not emit light by itself, and therefore, requires a separate backlight unit as a lighting device. The backlight unit is installed on a back side of the liquid crystal panel (side opposite to a display surface) and includes a chassis, a surface of which is opened on the side of the liquid crystal panel, a light source stored in the chassis, a reflection sheet that is arranged along an inner surface of the chassis and reflects light on the side of the opening of the chassis, and an optical member (diffuser sheet, etc.) that is arranged on the opening side of the chassis and efficiently discharges light emitted from the light source to the liquid crystal panel. Among the above-mentioned constituents of the backlight unit, the light source adopts, for example, an LED, and in such case, an LED substrate that mounts the LED thereon is stored in the chassis.

An example of the backlight unit using the LED as the light source is described in Patent Document 1.

PRIOR ART DOCUMENT

Patent Document

Patent Document 1: Japanese Unexamined Patent Publication 2007-317423

Problem to be Solved by the Invention

In the backlight unit with the above-mentioned configuration, the LED substrate arranged in the chassis together with the reflection sheet may be fixed to the chassis by means of a screw. At this time, when the LED substrate and the reflection sheet are fixed to multiple positions with the screws, following problems can occur.

That is, when thermal environment in the backlight unit changes, the LED substrate and the reflection sheet may expand or contract due to thermal expansion or thermal contraction. Here, when the LED substrate and the reflection sheet are strongly fixed to multiple positions with the screws, since expansion and contraction are restricted at the fixed places, local deformation such as warp and flexure is easy to be generated at unfixed places. When the reflection sheet has such deformation, irregularity in reflected light easily occurs, thereby exerting a negative effect on display quality. When the LED substrate has such deformation, a contact failure occurs at a connecting portion with an external circuit or the like, thereby possibly causing a deficiency in performing lighting control of the LED.

DISCLOSURE OF THE PRESENT INVENTION

The present invention was made in view of the forgoing circumstances, and the object is to reduce the tendency to generate local deformation in an extending member.

Means for Solving the Problem

A lighting device according to the present invention includes a light source, a chassis storing the light source therein, an extending member, and a holding member. The extending member extends along an inner surface of the chassis. The holding member is fixed to the chassis and holds the extending member to the chassis such that the extending member is sandwiched between the holding member and the chassis. The holding member includes a contact portion that protrudes toward the extending member and is in contact with the extending member.

With this configuration, when the holding member is fixed to the chassis, the extending member is sandwiched between the holding member and the chassis. Since the holding member includes the contact portion that protrudes toward the extending member and is in contact with the extending member, as compared to the case where the entire surface of the holding member, which is opposite to the extending member, is in contact with the extending member, the contact area of the holding member with the extending member can be reduced. Conversely speaking, in the extending member, the area of the part that is not in contact with the holding member and thus, is not pressed by the holding member increases. When thermal expansion or thermal contraction occurs due to change in the thermal environment, the unpressed part is easier to expand or contract than the part that is in contact with the holding member and is pressed by the holding member. When the area of the unpressed part increases, the degree of flexibility in expansion or contraction of the entirety of the extending member is enhanced, thereby preventing local deformation such as flexure or warp due to expansion or contraction.

By reducing the contact area of the holding member with the extending member as described above, the thermally expanded or contracted extending member can easily slide with respect to the contact place (contact portion) of the holding member, resulting in that the degree of flexibility in expansion or contraction of the extending member can be improved.

BRIEF DESCRIPTION OF THE DRAWINGS

FIG. 1 is an exploded perspective view showing a schematic configuration of a television receiver according to a first embodiment of the present invention;

FIG. 2 is an exploded perspective view showing a schematic configuration of a liquid crystal display device provided in the television receiver;

FIG. 21 is a sectional view showing the state where the holding member according to a second modification example of the first embodiment is attached to the chassis;

FIG. 23 is a sectional view showing the state where the holding member according to a third modification example of the first embodiment is attached to the chassis;

FIG. 26 is a sectional view showing the state where a holding member according to a first modification example of the second embodiment is attached to the chassis;

FIG. 27 is a sectional view showing the state where a holding member according to a second modification example of the second embodiment is attached to the chassis;

FIG. 31 is a sectional view showing a backlight unit according to a fourth embodiment of the present invention;

FIG. 32 is a sectional view showing the state where the holding members are attached to the chassis; and FIG. 33 is a sectional view showing a backlight unit according to a fifth embodiment of the present invention.

BEST MODE FOR CARRYING OUT THE INVENTION

First Embodiment

Figure 3:
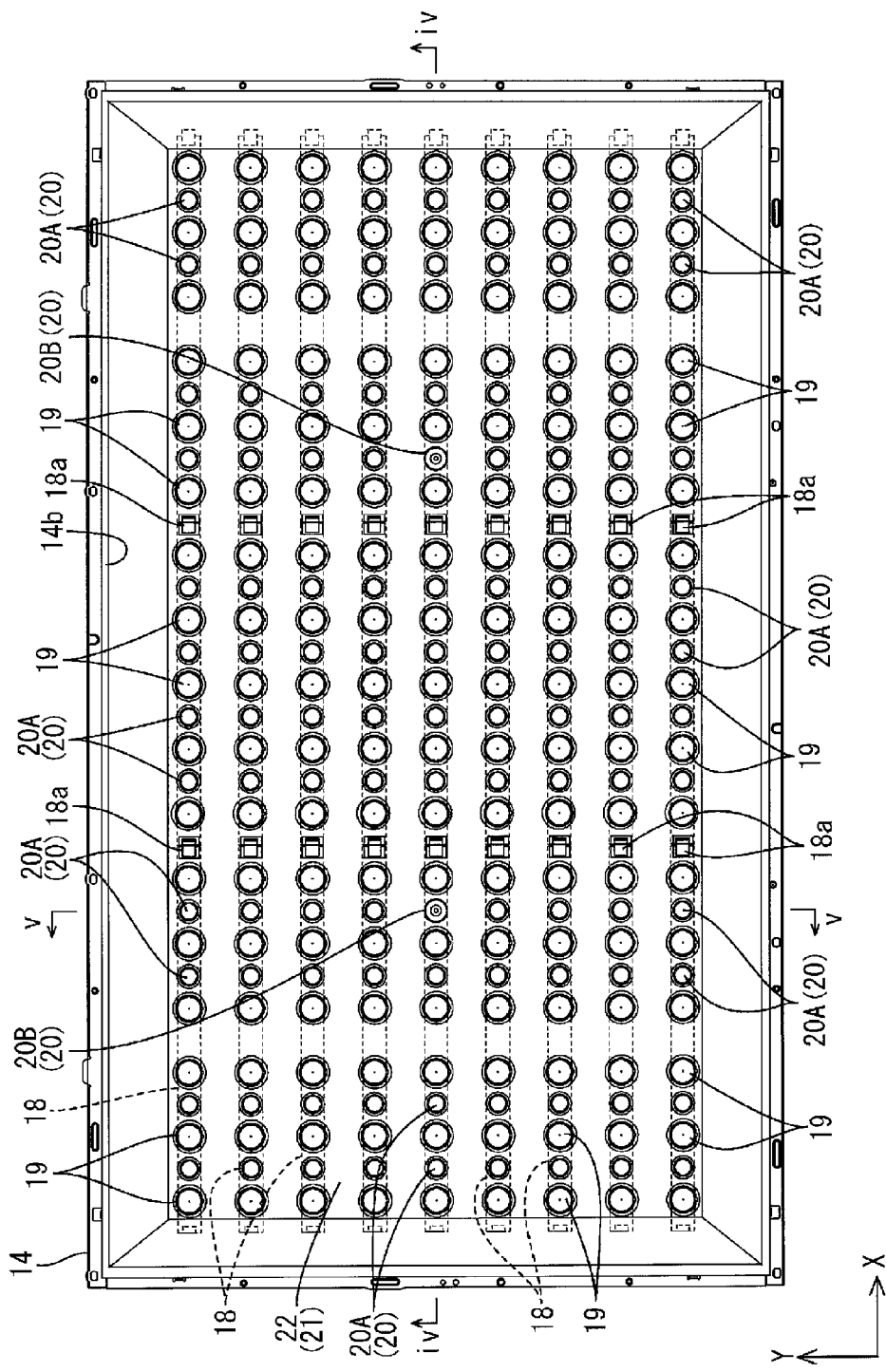
FIG. 3 is a plan view showing an arrangement configuration of LED substrates and holding members in a chassis provided in the liquid crystal display device.
Figure 4:
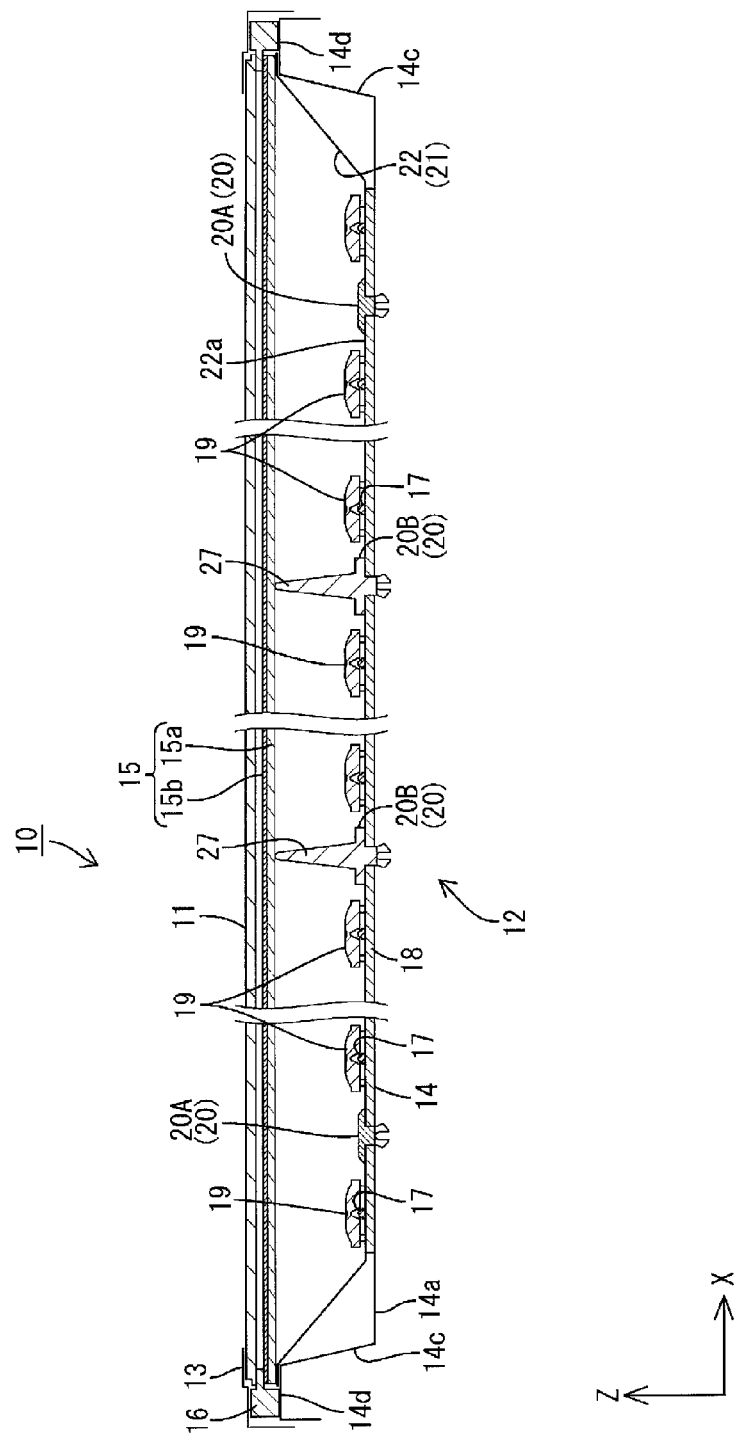
FIG. 4 is a sectional view taken along line iv-iv in FIG. 3 of the liquid crystal display device.
Figure 5:
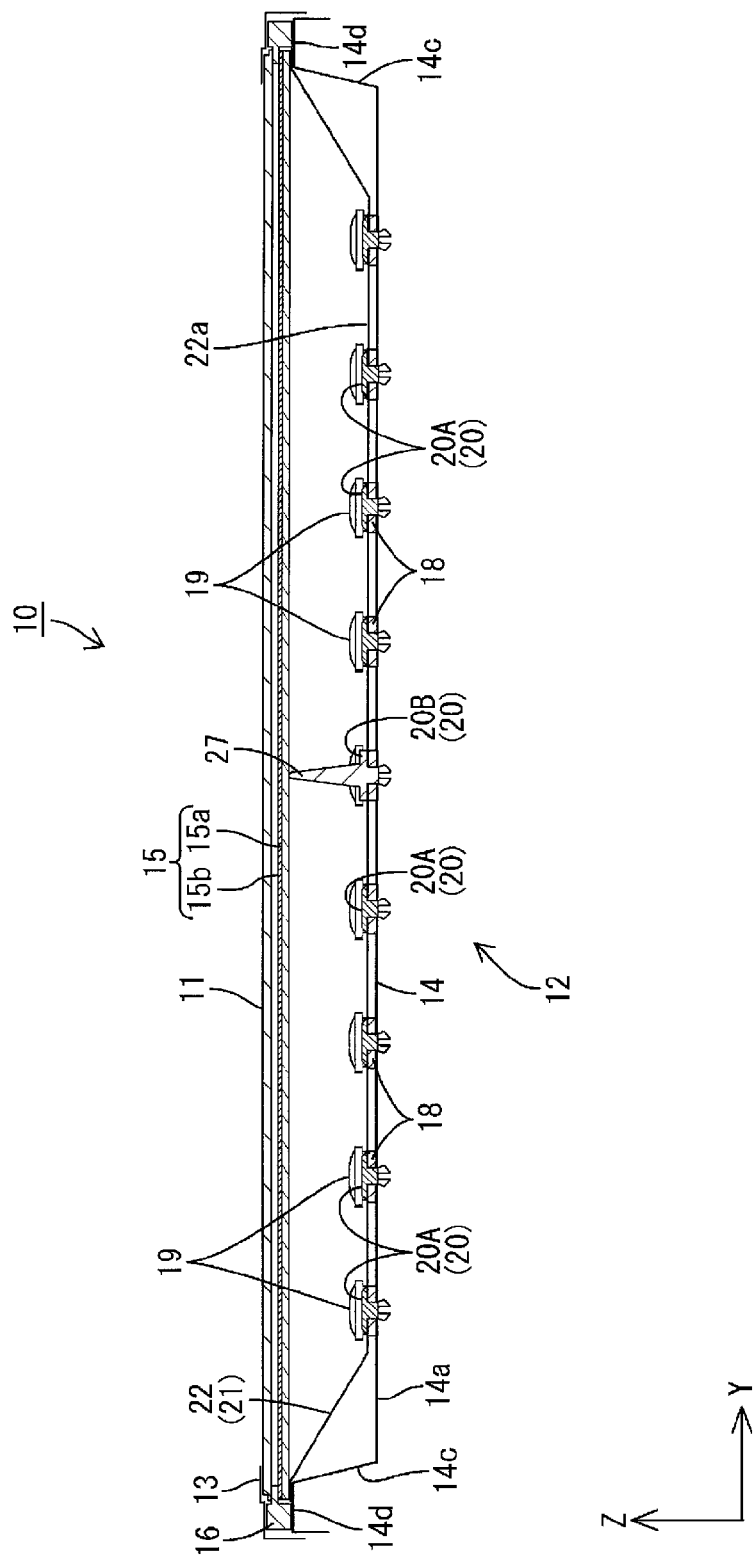
FIG. 5 is a sectional view taken along line v-v in FIG. 3 of the liquid crystal display device.

A first embodiment of the present invention will be described with reference to FIGS. 1 to 17. In this embodiment, a liquid crystal display device 10 is used as an example. A part of each figure shows an X-axis, a Y-axis and Z-axis, and a direction of each axis is represented in each figure. It is given that an upper side in FIGS. 4 and 5 is a front side and a lower side in these figures is a back side.

A television receiver TV according to this embodiment includes, as shown in FIG. 1, the liquid crystal display device 10, front and back cabinets Ca, Cb that store the liquid crystal display device 10 therebetween, a power source P, a tuner T and a stand S. The liquid crystal display device (display device) 10 is shaped like an oblong quadrangle as a whole (rectangular) and is stored in a longitudinally mounted state. The liquid crystal display device 10 includes, as shown in FIG. 2, a liquid crystal panel 11 as a display panel and a backlight unit (lighting device) 12 as an external light source, and these constituents are integrally held by a frame-like bezel 13 or the like. In this embodiment, it is assumed that a screen size is 42 inches and an aspect ratio is 16:9.

Next, the liquid crystal panel 11 and the backlight unit 12 that constitute the liquid crystal display device 10 will be successively described. The liquid crystal panel (display panel) 11 among them is rectangular in a plan view, and is formed by sticking a pair of glass substrates to each other with a predetermined gap therebetween and filling a liquid crystal between both the glass substrates. One glass substrate is provided with a switching component (for example, TFT) connected to a source wiring and a gate wiring that are orthogonal to each other, a pixel electrode connected to the switching component and an alignment film, and the other glass substrate is provided with a color filter in which color sections of R (red), G (green), B (blue) are arranged in a predetermined pattern, a counter electrode and an alignment film and the like. Polarizing plates are provided outer of both the substrates.

Subsequently, the backlight unit 12 will be described in detail. The backlight unit 12 includes, as shown in FIG. 2, a substantially box-like chassis 14 having openings 14b on the side of a light emitting surface (the side of the liquid crystal panel 11), an optical member group 15 (a diffuser (light diffusing member) 15a, and a plurality of optical sheets 15b arranged between the diffuser 15a and the liquid crystal panel 11) arranged so as to cover the openings 14b of the chassis 14, and a frame 16 that is arranged along an outer edge of the chassis 14 and holds an outer edge of the optical member group 15 between the frame 16 and the chassis 14. In the chassis 14, as shown in FIGS. 3 to 5, LEDs 17 (Light Emitting Diode) as light sources, LED substrates 18 (extending member) that mount the LEDs 17 thereon and diffuser lenses 19 attached at positions corresponding to the LEDs 17 on the LED substrates 18 are provided. In the chassis 14, holding members 20 capable of holding the LED substrates 18 between the holding members 20 and the chassis 14, and a reflection sheet 21 (extending member) reflecting light in the chassis 14 toward the optical member 15 are provided. In the backlight unit 12, the side of the optical member 15, not the LEDs 17, is set as a light emitting side. Hereinafter, each constituent of the backlight unit 12 will be described in detail.

The chassis 14 is made of metal, and as shown in FIGS. 3 to 5, is constituted of a rectangular bottom plate 14a like the liquid crystal panel 11, side plates 14c rising from outer ends of sides of the bottom plate 14a and receiving plates 14d extending outward from rising ends of the respective side plates 14c, and is shaped like a shallow box (substantially shallow dish) opened toward the front side 8 as a whole. In the chassis 14, its long-side direction corresponds to the X-axis direction (horizontal direction) and its short-side direction corresponds to the Y-axis direction (vertical direction). The frame 16 and the below-mentioned optical member 15 can be mounted on each of the receiving plates 14d of the chassis 14 from the front side. The frame 16 is secured to each of the receiving plates 14d with a screw. Attachment holes 14e for attaching the holding members 20 are provided in the bottom plate 14a of the chassis 14. The plurality of attachment holes 14e corresponding to attachment positions of the holding members 20 is distributed on the bottom plate 14a.

Figure 7:
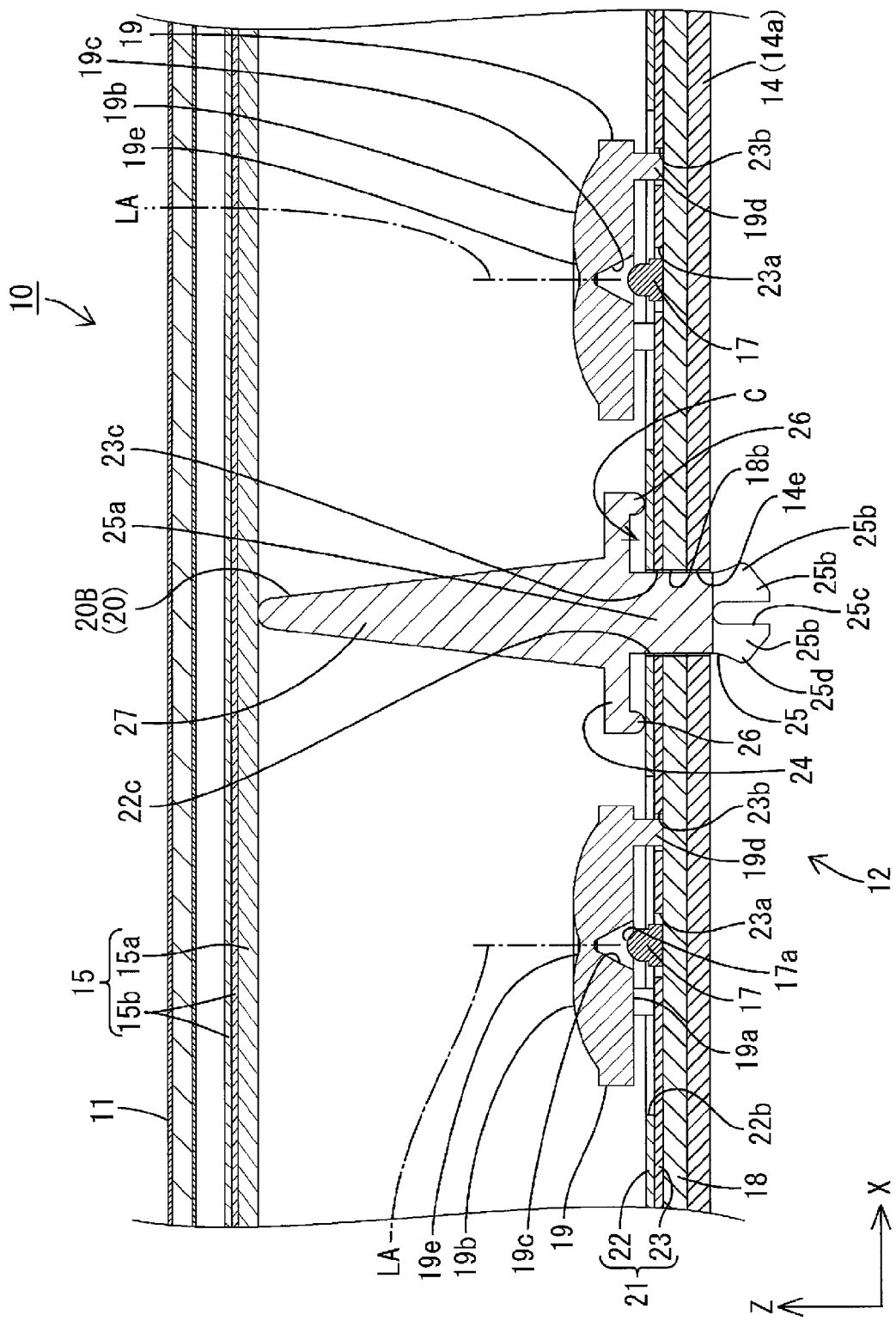
FIG. 7 is a sectional view taken along line vii-vii in FIG. 6.
Figure 8:
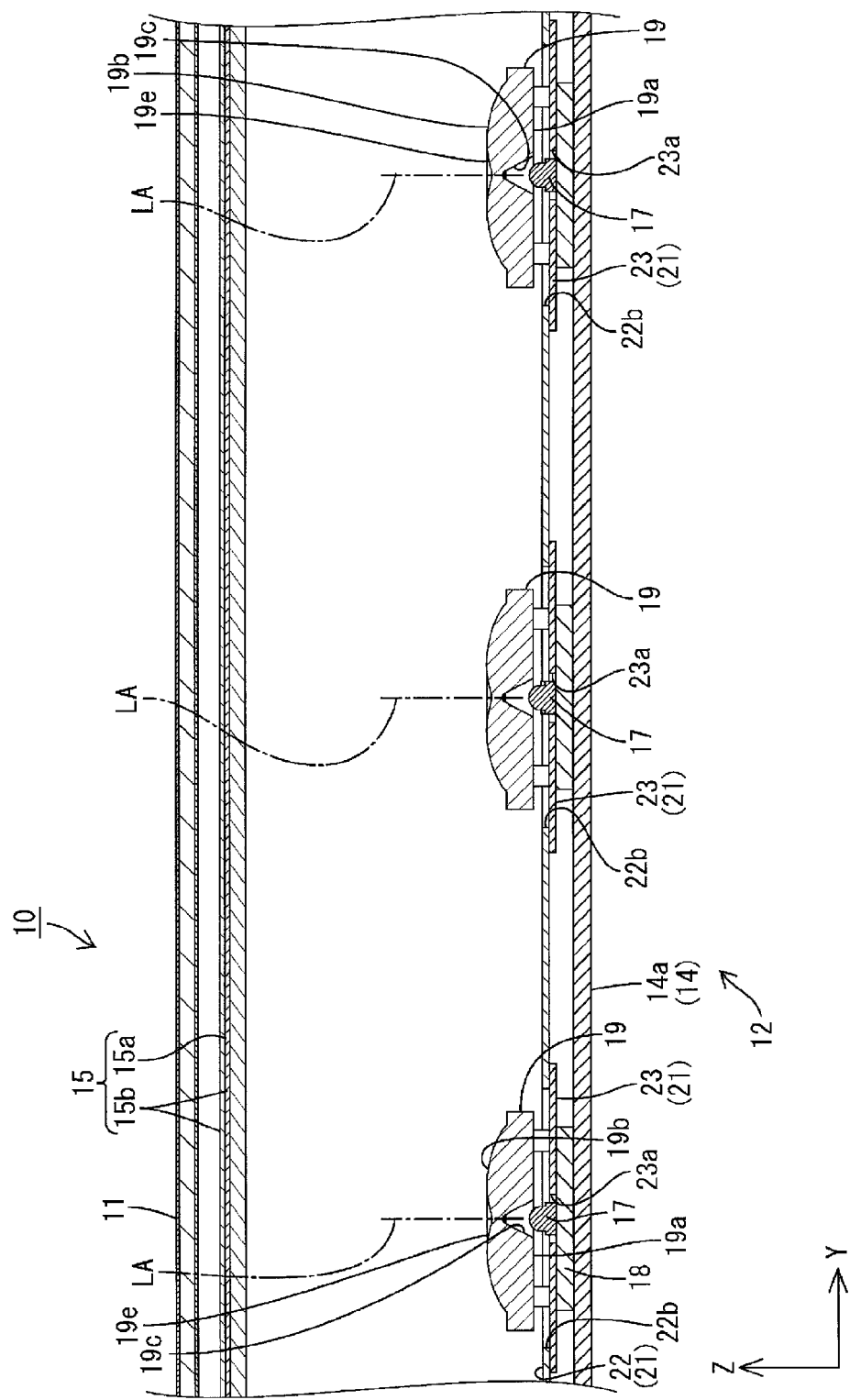
FIG. 8 is a sectional view taken along line viii-viii in FIG. 6.
Figure 9:
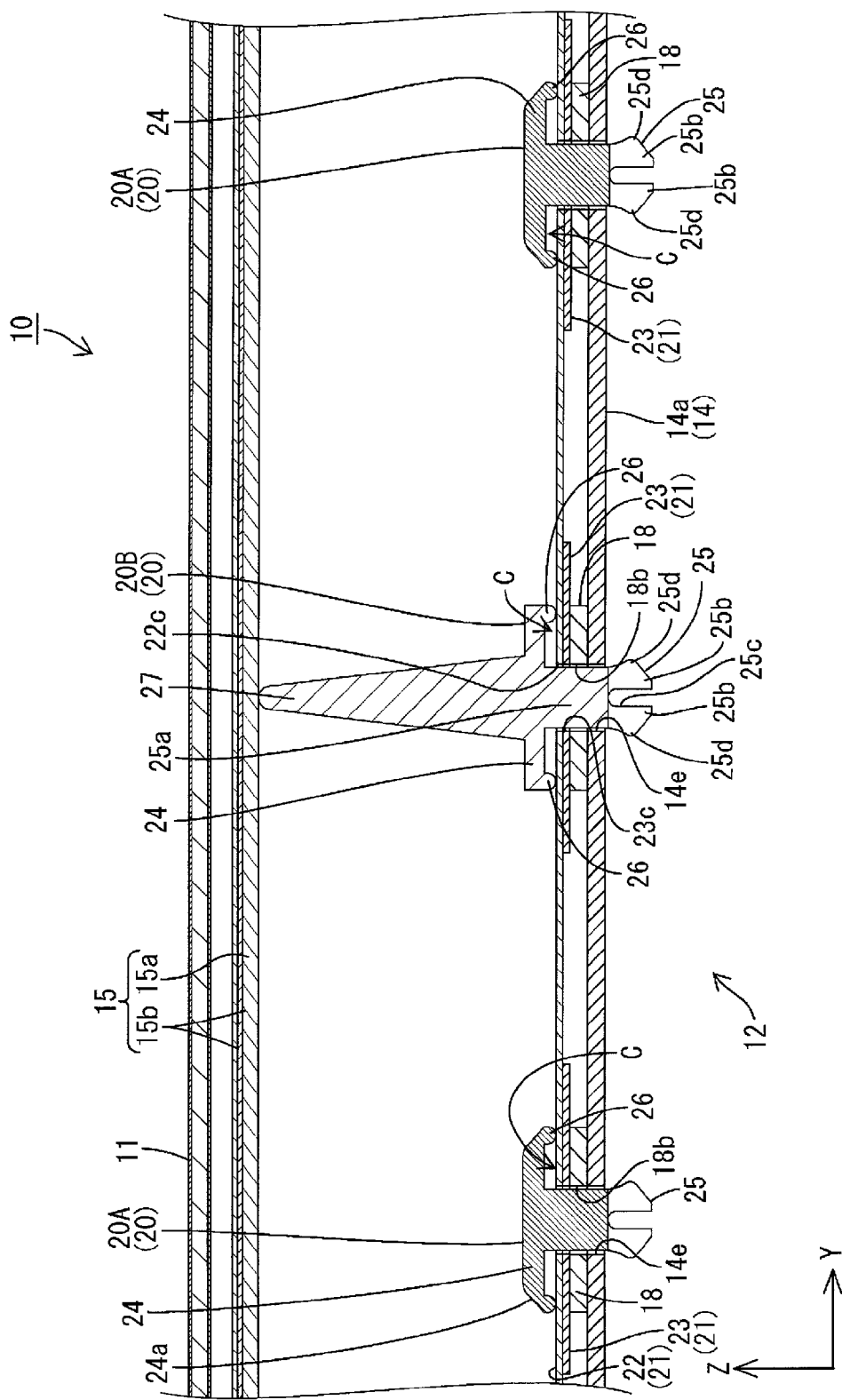
FIG. 9 is a sectional view taken along line ix-ix in FIG. 6.

As shown in FIG. 2, like the liquid crystal panel 11 and the chassis 14, the optical member 15 is shaped like an oblong quadrangle (rectangular) in a plan view. As shown in FIGS. 4 and 5, the optical member 15 covers the openings 14b of the chassis 14 by placing its outer edge on the receiving plates 14d, and is interposed between the liquid crystal panel 11 and the LEDs 17. The optical member 15 is constituted of the diffuser 15a arranged on the back side (the side of the LEDs 17, the side opposite to the light-emitting side) and the optical sheets 15b arranged on the front side (the side of the liquid crystal panel 11, the light-emitting side). The diffuser 15a is formed by dispersing multiple diffusing particles in a substantially transparent resin base member having a predetermined thickness and has a function of diffusing transmitted light. The optical sheet 15b is shaped like a thinner sheet than the diffuser 15a and two sheets are laminated (FIGS. 7 to 9). Specific examples of the optical sheets 15b includes diffuser sheets, lens sheets, reflection type polarizing sheets, and it is possible to select and use any of these sheets as appropriate.

As shown in FIG. 2, the frame 16 is shaped like a frame along outer circumferences of the liquid crystal panel 11 and the optical member 15. An outer edge of the optical member 15 can be pinched between the frame 16 and each of the receiving plates 14d (FIGS. 4 and 5). The frame 16 can receive the outer edge of the liquid crystal panel 11 from the back side and pinch the outer edge of the liquid crystal panel 11 between the frame 16 and the bezel 13 arranged on the front side (FIGS. 4 and 5).

Figure 10:
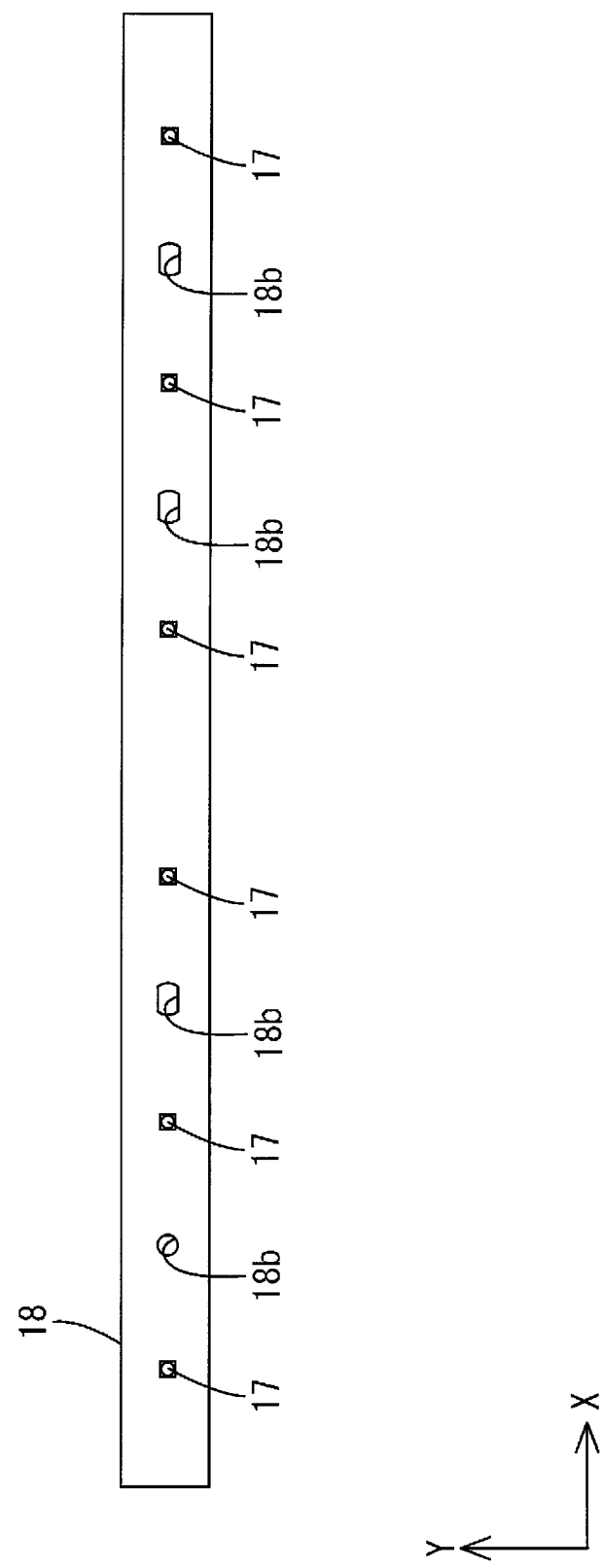
FIG. 10 is a plan view of the LED substrate.

Next, the LEDs 17 and the LED substrates 18 that mount the LEDs 17 thereon will be described in detail. As shown in FIG. 7, FIG. 8 and FIG. 10, each of the LED 17 is formed by sealing an LED chip on a substrate portion fixedly attached to the LED substrate 18 with a resin material. The LED chip mounted on the substrate portion has one type of main light-emitting wavelength, and specifically, emits only blue light. Meanwhile, phosphors converting blue light emitted by the LED chip into white light are dispersedly mixed in the resin material sealing the LED chip. Thereby, the LED 17 can emit white light. This LED 17 is a so-called top type in which a surface on the side opposite to the mounting surface of the LED substrate 18 acts as a light-emitting surface 17a. An optical axis LA in the LED 17 substantially corresponds to the Z-axis direction (the direction orthogonal to the liquid crystal panel 11 and a main plate surface of the optical member 15.) Light emitted from the LEDs 17 extends radially to some extent about the optical axis LA within a predetermined angular range in a three-dimensional way, and has a higher directivity than light from a cold cathode tube. That is, the light emission intensity of the LED 17 becomes remarkably high in a direction along the optical axis LA and rapidly lowers as inclination angle relative to the optical axis LA is larger.

Each of the LED substrates 18 has, as shown in FIG. 10, a base member shaped like a rectangle in a plan view, and is stored in the chassis 14 while extending along the bottom plate 14a in the state where its long-side direction corresponds to the X-axis direction and its short-side direction corresponds to the Y-axis direction (FIG. 3). The base member of the LED substrate 18 is made of metal such as aluminum material that is the same as the material for the chassis 14, and has a surface on which a wiring pattern formed of a metal film such as a copper foil is formed via an insulating layer. Insulating materials such as ceramic can be used as the material for the base member of the LED substrate 18. As shown in FIG. 7, FIG. 8 and FIG. 10, the LEDs 17 having the above-mentioned configuration are mounted on a surface facing the front side (surface facing the optical member 15 side) among surfaces of the base member of the LED substrate 18. The plurality of LEDs 17 is linearly arranged along the long-side direction of the LED substrates 18 (X-axis direction) in parallel, and are serially connected according to the wiring pattern formed on the LED substrates 18. The alignment pitch of the LEDs 17 is almost constant, that is, the LEDs 17 are arranged at regular intervals. A connector portion 18a is provided at both ends of each the LED substrates 18 in the long-side direction.

As shown in FIG. 3, the plurality of LED substrates 18 having the above-mentioned configuration is arranged in the chassis 14 in each of the X-axis direction and the Y-axis direction so that the LED substrates 18 are aligned in the long-side direction and the short-side direction in parallel. That is, the LED substrates 18 and the LEDs 17 mounted thereon are arranged in the chassis 14 in a matrix having the X-axis direction (the long-side direction of the chassis 14 and the LED substrate 18) as a row direction and the Y-axis direction (the short-side direction of the chassis 14 and the LED substrate 18) as the column direction. Specifically, the three LED substrates 18 in the X-axis direction×the nine LED substrates 18 in the Y-axis direction, that is, 27 LED substrates 18 in total are arranged in the chassis 14 in parallel. In this embodiment, two types of LED substrates 18 having different long-side dimensions and the number of mounted LEDs 17 are used. Specifically, a six-mounted type of the LED substrate 18 that mounts the six LEDs 17 thereon and has a relatively long long-side dimension and a five-mounted type of the LED substrate 18 that mounts the six LEDs 17 thereon and has a relatively short long-side dimension are used as the LED substrates 18, and the six-mounted type of the LED substrate 18 is arranged at each end of the chassis 14 in the X-axis direction and the five-mounted type of the LED substrate 18 is arranged at the center in the same direction. As described above, the LED substrates 18 aligned in one row in the X-axis direction are electrically connected to each other by fitting the adjacent connector portions 18a with each other, and the connector portions 18a located at both ends of the chassis 14 in the X-axis direction are each electrically connected to an external control circuit not shown. Thereby, the LEDs 17 arranged on the LED substrate 18 forming one row are serially connected to one another, so that lighting-on and off of the lot of LEDs 17 contained in the one row can be controlled together by one control circuit, which enables reduction in costs. Even the different types of LED substrates 18 having different long-side dimensions and the number of mounted LEDs 17 have the substantially identical short-side dimension and alignment pitch of the LEDs 17.

By preparing plural types of LED substrates 18 having different long-side dimensions and the number of mounted LEDs 17 and appropriately using the different types of LED substrates 18 in combination, following effects can be obtained. That is, plural types of liquid crystal display device 10 having different screen sizes can be manufactured by appropriately changing the appropriateness of use of each type of LED substrate 18 and the number of LED substrates 18 of each type according to each screen size, and as compared to the case where a dedicated LED substrate having the same long-side dimension as the long-side dimension of the chassis 14 is prepared for each screen size, the number of types of necessary LED substrates 18 can be greatly reduced, which enables reduction in costs. Specifically, by adding an eight-mounted type LED substrate that mounts eight LEDs 17 thereon to the above-mentioned two types of LED substrates 18 (the five-mounted type and the six-mounted type) and appropriately using the three types of LED substrates 18 in combination, each of the liquid crystal display devices 10 having the screen size of 26 inches, 32 inches, 37 inches, 40 inches, 42 inches, 46 inches, 52 inches and 65 inches can be easily manufactured.

Figure 11:
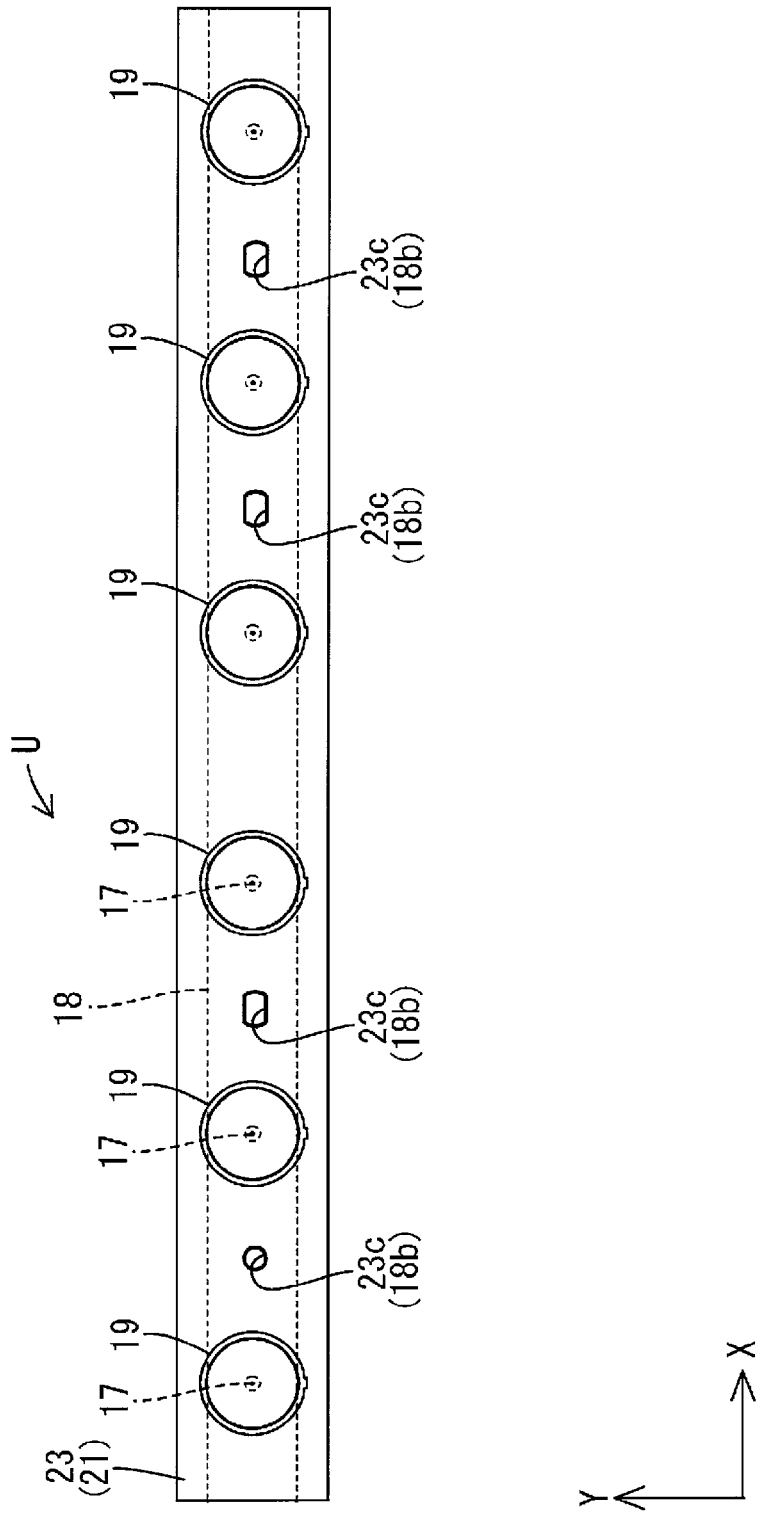
FIG. 11 is a plan view showing the state where a second reflection sheet and diffuser lenses are attached to the LED substrate (light source unit)
Figure 12:
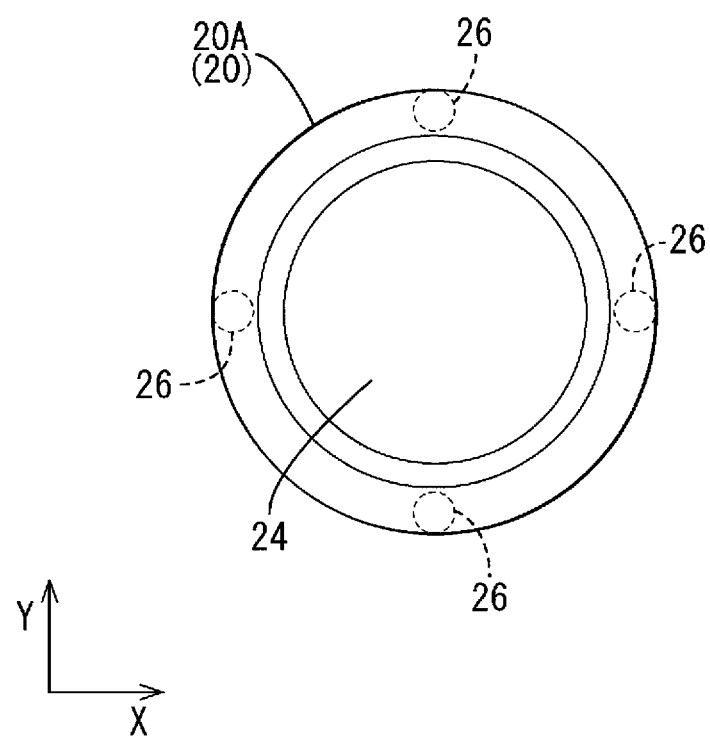
FIG. 12 is a plan view showing a single function-type holding member.

The diffuser lenses 19 are made of a synthetic resin material (e.g. polycarbonate and acrylic) that is substantially transparent (highly light transmissive) and has a higher refractive index than air. As shown in FIG. 7, FIG. 8 and FIG. 11, the diffuser lenses 19 each have a predetermined thickness, are formed to be substantially circular in a plan view, and are attached so as to cover the respective LEDs 17 from the front side of the LED substrate 18, that is, to overlap the respective LEDs 17 in a plan view. The diffuser lenses 19 can emit highly directive light from the LEDs 17 while diffusing the light. That is, since directivity of the light emitted from the LEDs 17 is reduced through the diffuser lenses 19, even when the interval of the adjacent LEDs 17 is set large, a region between the LEDs 17 is hard to be visually recognized as a dark place. Thereby, the number of installed LEDs 17 can be reduced. Each diffuser lens 19 is located to be substantially concentric with each LED 17 in a plan view. Each diffuser lens 19 has sufficiently larger dimensions in the X-axis direction and in the Y-axis direction than each LED 17. Although the diffuser lens 19 has a smaller dimension in the X-axis direction than the LED substrate 18, the diffuser lens 19 has a larger dimension Y-axis direction than the LED substrate 18. Accordingly, both ends of the diffuser lens 19 in the Y-axis direction each protrude outward by a predetermined dimension from the LED substrate 18 in the Y-axis direction.

In each of the diffuser lenses 19, a surface that faces the back side and is opposite to the LED substrate 18 is a light incidence surface 19a on which light from the LED 17 is incident, while a surface that faces the front side and is opposite to the optical member 15 is a light emitting surface 19b. As shown in FIGS. 7 and 8, the light incidence surface 19a extends in parallel to a plate surface of the LED substrate 18 (the X-axis direction and the Y-axis direction) as a whole, but has an inclined surface obtained by forming a light incidence-side concave portion 19c in a region where the light incidence surface 19a and the LED 17 overlap each other in a plan view. The light incidence-side concave portion 19c is substantially conical, is located to be almost concentric with the diffuser lens 19 and is opened toward the back side, that is, the LED 17. The light incidence-side concave portion 19c has the largest diameter at its opened end facing the LED 17, which is larger than the diameter of the LED 17, and becomes smaller toward the front side in diameter continually and gradually, and finally becomes the smallest at its end of the front side. The light incidence-side concave portion 19c has a substantially inverted V-shaped cross section and a circumferential surface thereof is inclined relative to the Z-axis direction. The inclined surface is inclined so that the end of the front side crosses the optical axis LA of the LED 17. Accordingly, light emitted from the LED 17 and entering into the light incidence-side concave portion 19c is incident into the diffuser lens 19 through the inclined surface. At this time, the incident light is refracted away from the center, that is, with a wide angle, by an inclined angle of the inclined surface relative to the optical axis LA and is incident into the diffuser lens 19.

Attachment shaft portions 19d that protrude toward the LED substrate 18 and serve as attachment structure of the diffuser lens 19 to the LED substrate 18 are provided at positions outer of the light incidence-side concave portion 19c in the radial direction, on the light incidence surface 19a in the diffuser lens 19. The three attachment shaft portions 19d are located closer to an outer edge than the light incidence-side concave portion 19c in the diffuser lens 19, and a line connecting the attachment portions is substantially equilateral-triangular in a plan view. By fixing each of front ends of the attachment shaft portions 19d to the LED substrate 18 with an adhesive or the like, the diffuser lens 19 can be fixedly attached to the LED substrate 18. The diffuser lens 19 is fixed to the LED substrate 18 through the attachment shaft portions 19d so as to have a predetermined gap between the light incidence surface 19a and the LED substrate 18. This gap allows incidence of light from space outer of the diffuser lens 19 in a plan view. In the above-mentioned attachment state, a front end of the LED 17 protruding from the LED substrate 18 enters into the light incidence-side concave portion 19c.

The light emitting surface 19b in the diffuser lens 19 is shaped like a substantially flat spherical surface. Thereby, the diffuser lens 19 can emit light while refracting the light on an interface with an external air layer in a direction away from the center, that is, with a wide angle. A light-emitting side concave portion 19e is formed in a region where the light emitting surface 19b overlaps the LED 17 in a plan view. The light-emitting side concave portion 19e is substantially bowl-like and is shaped like a substantially flat sphere having a circumferential surface inclined downward toward the center. An angle that a tangent line to the circumferential surface of the light-emitting side concave portion 19e forms with the optical axis LA of the LED 17 is set to be larger than an angle that the inclined surface of the light incidence-side concave portion 19c forms with the optical axis LA. The region where the light emitting surface 19b overlaps the LED 17 in a plan view receives extremely larger light amount from the LED 17 than the other region and therefore, its brightness tends to locally become high. However, by forming the light-emitting side concave portion 19e in the region, it becomes possible to emit most of light from the LED 17 while refracting the light with a wide angle, or reflect a part of the light from the LED 17 toward the LED substrate 18. Thereby, it is possible to prevent the brightness of the region where the light emitting surface 19b overlaps the LED 17 from locally becoming high, which is suitable for prevention of uneven brightness.

Next, the reflection sheet 21 will be described. The reflection sheet 21 is constituted of a first reflection sheet 22 that covers the substantially entire range of the inner surface of the chassis 14 and a second reflection sheet 23 that covers each of the LED substrates 18. Both the reflection sheets 22, 23 each are made of synthetic resin and have a white surface with excellent light reflectance. Both the reflection sheets 22, 23 extend along the bottom plate 14a (the LED substrate 18) in the chassis 14.

Figure 6:
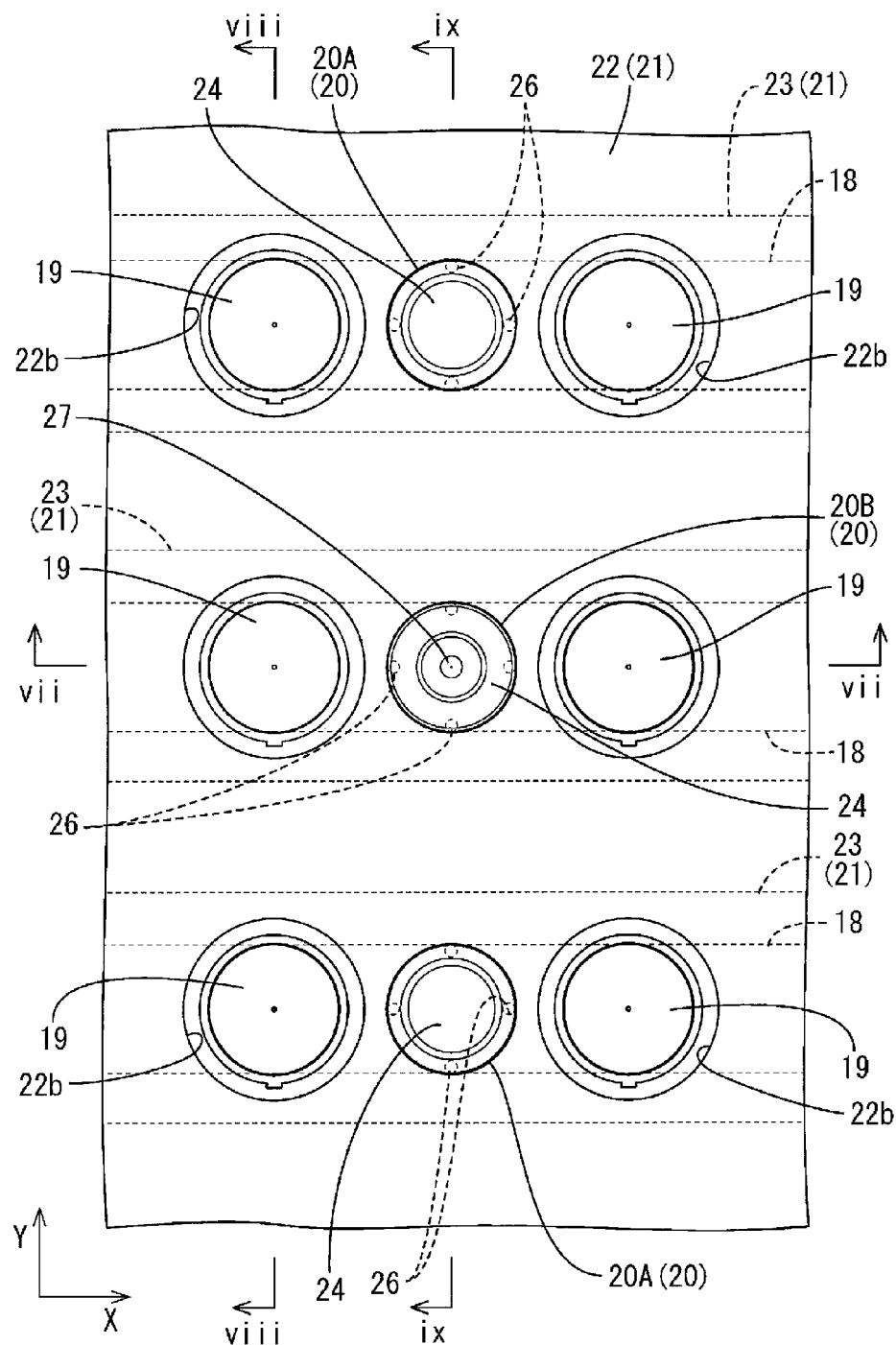
FIG. 6 is a plan view showing a detailed arrangement configuration of the LED substrates and the holding members.

First, the first reflection sheet 22 will be described. As shown in FIG. 3, most of the first reflection sheet 22 on the center side, which extends along the bottom plate 14a of the chassis 14, is a body portion 22a. A lens insertion hole 22b that can insert each LED 17 arranged in the chassis 14 as well as each diffuser lens 19 covering the LED 17 thereinto is formed through the body portion 22a. The plurality of lens insertion holes 22b is arranged in parallel at positions where the holes 22b overlap the LEDs 17 and diffuser lenses 19 on the body portion 22a in a plan view in a matrix. As shown in FIG. 6, each lens insertion hole 22b is circular in a plan view and has a larger diameter than the diffuser lens 19. Thereby, when the first reflection sheet 22 is installed in the chassis 14, the diffuser lenses 19 can be inserted into the respective lens insertion holes 22b irrespective of presence or absence of dimensional error. Since the first reflection sheet 22 covers regions between adjacent diffuser lenses 19 and regions on the outer circumferential side in the chassis 14 as shown in FIG. 3, light toward each of the regions can be reflected toward the optical member 15. Further, as shown in FIGS. 4 and 5, outer circumferential portions of the first reflection sheet 22 rise so as to cover the side plates 14c and the receiving plates 14d of the chassis 14, and portions placed on the receiving plates 14d are sandwiched between the chassis 14 and the optical member 15. A portion connecting the body portion 22a of the first reflection sheet 22 to each of the portions placed on the receiving plates 14d is inclined.

Meanwhile, the second reflection sheet 23 has, as shown in FIG. 11, the almost same appearance as the LED substrate 18, that is, is rectangular in a plan view. As shown in FIGS. 7 and 8, the second reflection sheet 23 is arranged so as to overlap the front side surface of the LED substrate 18, and is opposite to the diffuser lens 19. That is, the second reflection sheet 23 is interposed between the diffuser lens 19 and the LED substrate 18. Accordingly, light returned from the diffuser lens 19 to the LED substrate 18 and light entering from space outer of the diffuser lens 19 in a plan view into space between the diffuser lens 19 and the LED substrate 18 can be reflected toward the diffuser lens 19 by the second reflection sheet 23 again. As a result, light utilization efficiency can be enhanced, thereby increasing brightness. In other words, even when the number of installed LEDs 17 is reduced to cut costs, sufficient brightness can be obtained.

As shown in FIG. 11, the second reflection sheet 23 has the almost same long-side dimension as the LED substrate 18 and has a larger short-side dimension than the LED substrate 18. Further, as shown in FIGS. 6 and 8, the short-side dimension of the second reflection sheet 23 is set to be larger than the diameter of the diffuser lens 19 and the lens insertion hole 22b of the first reflection sheet 22. Accordingly, the edge of the lens insertion hole 22b of the first reflection sheet 22 can be placed on the second reflection sheet 23 on the front side. Thereby, the first reflection sheet 22 and the second reflection sheet 23 are continuously arranged in the chassis 14 without any gap in a plan view, so that the chassis 14 or the LED substrate 18 is hardly exposed from the lens insertion hole 22b toward the front side. Therefore, light in the chassis 14 can be efficiently reflected toward the optical member 15, which is extremely preferable for improvement of brightness. LED insertion holes 23a that insert the respective LEDs 17 therethrough and shaft portion insertion holes 23b that insert the respective attachment shaft portions 19d of the diffuser lens 19 therethrough are formed in the second reflection sheet 23 at overlapping positions in a plan view.

Subsequently, the holding member 20 will be described. The holding member 20 includes two types: a complex function-type holding member 20B having both a holding function of holding the LED substrate 18 and a supporting function of supporting the optical member 15, and a single function-type holding member 20A having the holding function and no supporting function. Hereinafter, when the holding member 20 is discriminated, a subscript A is added to the single function-type and a subscript B is added to the complex function-type. When the holding member 20 is collectively called without being discriminated, no subscript is added to the reference numeral.

First, arrangement of the holding member 20 in the chassis 14 will be described. As shown in FIG. 3, multiple holding members 20 are arranged on the bottom plate 14a of the chassis 14. Describing in detail, given that the X-axis direction (the long-side direction of the chassis 14 and the LED substrate 18) is the row direction and the Y-axis direction (the short-side direction of the chassis 14 and the LED substrate 18) in the bottom plate 14a, the holding members 20 are arranged in the row and column directions (arranged in a matrix). Each of the holding members 20 is located at a position where the holding member overlaps each LED substrate 18 in a plan view and between adjacent diffuser lenses 19 (LEDs 17). Accordingly, the holding members 20 are arranged like the above-mentioned diffuser lenses 19 and the LEDs 17. Since one holding member 20 is arranged in a region between the adjacent diffuser lenses 19 (LEDs 17) on the LED substrate 18, the diffuser lenses 19 (LEDs 17) and the holding members 20 are alternately arranged in the substantially X-axis direction. Specifically, the four holding members 20 are attached to each LED substrate 18. On the six-mounted type of LED substrate 18, the holding members 20 are arranged at positions other than the central position in the long-side direction in the regions between the adjacent diffuser lenses 19 (LEDs 17), and in the five-mounted type of LED substrate 18, the holding members 20 are arranged in all of the regions between the adjacent diffuser lenses 19 (LEDs 17).

As shown in FIG. 3, the a lot of holding members 20 arranged as described above are the single function-type holding members 20A except for later-described two complex function-type holding member 20B. The two complex function-type holding member 20B each are arranged at a position that is central in the short-side direction and closer to the center than an outer end in the long-side direction in the chassis 14. Describing the arrangement in the long-side direction in detail, the complex function-type holding members 20B are arranged symmetrically about the central LED substrate 18 among the three LED substrates 18 aligned in parallel in the X-axis direction.

Subsequently, specific configuration of the holding member 20 will be described. Although two types of holding members 20 exist as described above, the holding members 20 have mainly a common structure and the common structure will be described first. The holding member 20 is made of synthetic resin such as polycarbonate, and has a white surface with excellent light reflectance. The holding member 20 is substantially circular in a plan view as a whole. As shown in FIGS. 7 and 9, the holding member 20 includes a body portion 24 along the bottom plate 14a of the chassis 14 and the plate surface of the LED substrate 18, and a fixed portion 25 that protrudes from the body portion 24 toward the back side, that is, the chassis 14 and is fixed to the chassis 14. The holding member 20 is shaped symmetrically about a central axis in the Z-axis direction as a whole.

As shown in FIGS. 12 to 15, the body portion 24 is substantially circular in a plan view, and is shaped like an almost straight plate extending in the X-axis direction and the Y-axis direction. As shown in FIG. 6, the body portion 24 has the almost same diameter as the short-side dimension (dimension in the Y-axis direction) of the LED substrate 18. The body portion 24 is attached to the LED substrate 18 so as to overlap the LED substrate 18 in a plan view, thereby holding the LED substrate 18 between the body portion and the bottom plate 14a of the chassis 14. Since the body portion 24 is attached in the state where the reflection sheets 22, 23 are arranged beforehand on the front side of the LED substrate 18, the reflection sheets 22, 23 together with the LED substrate 18 can be sandwiched (FIGS. 7 and 9).

Describing in detail, as shown in FIG. 6, the body portion 24 is arranged so that its center corresponds to the center of the LED substrate 18 in the short-side direction. Accordingly, the body portion 24 can pinch the LED substrate 18 between the body portion and the chassis 14 over the entire length in the short-side direction. At this time, both outer ends of the body portion 24 in the Y-axis direction substantially coincide with both outer ends of the LED substrate 18 in the short-side direction. That is, the body portion 24 overlaps the LED substrate 18 almost entirely in a plan view, thereby being prevented from extending outside of the LED substrate 18. The diameter of the body portion 24 is set to be smaller than the interval (alignment pitch) between the adjacent diffuser lenses 19 (LEDs 17) in the X-axis direction. Thereby, the body portion 24 is arranged in a region between the adjacent diffuser lenses 19 (LEDs 17) on the LED substrate 18 in the X-axis direction, that is, in a non-luminous portion of the LED substrate 18 and thus, does not overlap the LED 17 in a plan view. That is, it is possible to prevent the body portion 24 from disturbing light emission from the LED 17. In this embodiment, since the interval between the LEDs 17 is made sufficiently large by using the diffuser lens 19 as described above, the holding member 20 is arranged in the space to fix the LED substrate 18.

Figure 13:
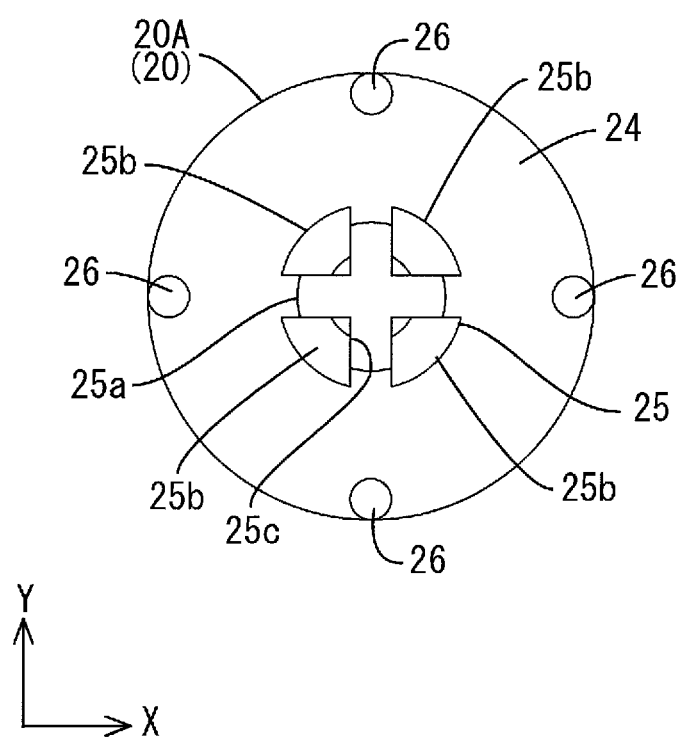
FIG. 13 is a bottom view showing the single function-type holding member.
Figure 15:
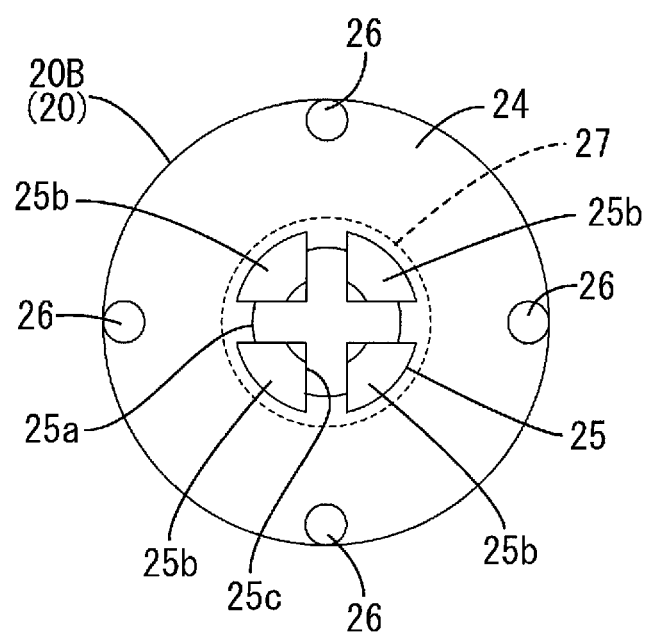
FIG. 15 is a bottom view showing the complex function-type holding member.

As shown in FIG. 9, the fixed portion 25 can be engaged with the bottom plate 14a of the chassis 14 through the attachment holes 14e formed at the attachment position of the holding member 20 on the bottom plate 14a. Hereinafter, detailed configuration of the fixed portion 25 will be described. As shown in FIGS. 13 and 15, the fixed portion 25 is arranged on the center side of the body portion 24. Describing in detail, the fixed portion 25 is arranged to be concentric with the body portion 24. The fixed portion 25 protrudes, as shown in FIG. 9, from the back side surface of the body portion 24 (surface opposite to the chassis 14) toward the back side, and a grooved portion 25c is formed at a front end of the fixed portion 25 to form elastic engaged portions 25b. In other words, the fixed portion 25 is constituted of a bottom portion 25a protruding from the body portion 24 toward the back side, and the elastic engaged portions 25b protruding a protruding front end of the bottom portion 25a further toward the back side. The bottom portion 25a is substantially cylindrical and has a diameter that is smaller than that of the attachment holes 14e of the chassis 14 so as to allow insertion into the attachment holes 14e.

As shown in FIGS. 13 and 15, the elastic engaged portions 25b are four portions divided by the substantially crosswise grooved portion 25c in a plan view. Each of the elastic engaged portions 25b cantilevers as shown in FIGS. 7 and 9, and is elastically deformable using a protruding bottom end part of the bottom portion 25a as a fulcrum while forming a hollow into the grooved portion 25c. That is, the grooved portion 25c serves as flexure space for the elastic engaged portions 25b. Engaging portion 25d swelling outward, that is, to the side opposite to the grooved portion 25c, are provided on outer side surfaces of the elastic engaged portions 25b. Each of the engaging portions 25d protrudes outward further than the outer circumferential surface of the bottom portion 25a, and the diameter of the fixed portion 25 at the swelled ends (the largest diameter) is larger than the diameter of the attachment hole 14e. In other words, the swelled ends of the engaging portion 25d are located outer of the inner circumferential surface of the attachment holes 14e. Accordingly, the engaging portions 25d can be engaged with the edge of the attachment hole 14e of the chassis 14, that is, the part adjacent to the fixed portion 25 in the chassis 14, from the back side. When the fixed portion 25 is inserted into the attachment hole 14e of the chassis 14 in this manner, each elastic engaged portion 25b passes through the attachment hole 14e and is elastically engaged with the edge of the attachment hole 14e from the back side. In this manner, the holding member 20 can be fixedly attached to the chassis 14. The plurality of attachment holes 14e is arranged in parallel at the attachment positions of the holding members 20 on the bottom plate 14a of the chassis 14 in the X-axis direction and the Y-axis direction in a matrix.

As shown in FIG. 6, the body portion 24 provided with the fixed portion 25 entirely overlaps the LED substrate 18 in a plan view. Accordingly, since the fixed portion 25 also overlaps the LED substrate 18 in a plan view, a through hole 18b that passes the fixed portion 25 therethrough is formed in the LED substrate 18. As shown in FIG. 10, the through hole 18b is located between the adjacent LEDs 17 (diffuser lenses 19) on the LED substrate 18, that is, at the non-overlapping position with the LED 17 (diffuser lens 19) in a plan view. The through hole 18b is elongated in the X-axis direction in a plan view, and its both short-side edges are formed to be a circular arc. The through hole 18b has a short-side dimension that allows insertion of the fixed portion 25 and a long-side dimension that is larger than the short-side dimension. As shown in FIGS. 7 and 9, since the through hole 18b passes through the LED substrate 18 in the Z-axis direction, the fixed portion 25 can pass through the LED substrate 18. Accordingly, the LED substrate 18 can be positioned in the X-axis direction and the Y-axis direction by the fixed portion 25 passing through the through hole 18b. As shown in FIG. 7, FIG. 9 and FIG. 11, communicating holes 22c, 23c that communicate with the through hole 18b and can pass the fixed portion 25 therethrough are formed at positions overlapping with the through hole 18b in a plan view on the reflection sheets 22, 23 sandwiched between the body portion 24 and the LED substrate 18, respectively.

As shown in FIGS. 7 and 9, the body portion 25 of the holding member 20 according to this embodiment is provided with contact portions 26 that protrude toward the back side, that is, toward the reflection sheet 21 (LED substrate 18, chassis 14) and are contacted with the reflection sheet 21. The contact portions 26 can contact the first reflection sheet 22 of the reflection sheet 21 to directly press the first reflection sheet 22 from the front side and indirectly press the second reflection sheet 23 and the LED substrate 18 from the front side via the first reflection sheet 22. Since the contact portions 26 are partially protruded from the back side surface (surface opposite to the first reflection sheet 22) of the body portion 24, as compared to the case where the entire back side surface of the body portion is in contact with the first reflection sheet 22, the contact area with the first reflection sheet 22 is reduced. In the state where the contact portions 26 are in contact with the first reflection sheet 22, the back side surface of the body portion 24 floats from the first reflection sheet 22 in a non-contact state, and a gap C corresponding to the protruding dimension of the contact portion 26 is ensured between the back side surface of the body portion 24 and the front side surface of the first reflection sheet 22.

As shown in FIGS. 13 and 15, the contact portions 26 are located at a position in the body portion 24 away from the fixed portion 25, specifically, at an outer edge of the body portion 24. It means that the contact portions 26 are arranged at positions that are farthest from the fixed portion 25 located at the center of the body portion 24. A part of the body portion 24 according to this embodiment from the fixed portion 25 to the contact portions 26 has predetermined elasticity, and is elastically deformable according to stress applied. Two pairs of the contact portions 26 are each located at the body portion 24 across the fixed portion 25, that is, four contact portions 26 in total are arranged. Describing in detail, the contact portions 26 are arranged at body portion 24 at intervals of about 90 degrees, that is, on two straight lines that pass the center of the body portion 24 and the fixed portion 25 and are orthogonal to each other. In other words, the contact portions 26 are located at the body portion 24 to be symmetrical about the fixed portion 25. Accordingly, the distance between the fixed portion 25 and each of the contact portions 26 is equal. Each contact portion 26 is point when viewing the plate surface of the body portion 24 in a plan view. Thus, since contact points of the holding member 20 with the first reflection sheet 22 are dispersed on the plate surface of the body portion 24 at regular intervals in a well-balanced manner, the holding member 20 can be stably supported on the first reflection sheet 22 without any unsteadiness (FIG. 6).

As shown in FIGS. 7 and 9, each contact portion 26 is substantially hemispherical as a whole, and its circumferential surface (contact surface with the first reflection sheet 22) is a spherical surface. Accordingly, each contact portion 26 is in point contact with the first reflection sheet 22. Thereby, the contact area of each contact portion 26 with the first reflection sheet 22 becomes minimum.

Next, difference between the two types of holding members 20 in configuration will be described. As shown in FIG. 9, an inclined surface 24a is formed on an outer circumferential end surface of the body portion 24 in the single function-type holding member 20A. The inclined surface 24a is inclined downward from the center toward the outer end of the body portion 24, thereby eliminating or reducing possible step from the first reflection sheet 22. As a result, the outer circumference (boundary with the reflection sheet 21) of the body portion 24 is hard to be visually recognized as uneven brightness through the optical member 15. Although not shown, the inclined surface 24a may be provided at the complex function-type holding member 20B.

As shown in FIGS. 7 and 9, the complex function-type holding member 20B includes a supporting portion 27 that protrudes the body portion 24 toward the front side and can support the optical member 15 from the back side. The supporting portion 27 is conical as a whole. Describing in detail, the supporting portion 27 has a circular cross section cut along the plate surface of the body portion 24 and is tapered so that its diameter becomes smaller from a protruding bottom end toward a protruding front end. The supporting portion 27 can contact the diffuser 15a located closest to the back side (LED 17 side) in the optical member 15, thereby supporting the diffuser 15a at a predetermined position. That is, the supporting portion 27 can restrict positional relationship between the optical member 15 and the LED 17 in the Z-axis direction (the direction orthogonal to the surface of the optical member 15) to be constant.

The outer diameter of a protruding bottom end of the supporting portion 27 is set to be smaller than both the short-side dimension of the body portion 24 and the short-side dimension of the LED substrate 18. That is, the supporting portion 27 is point in a plan view, while the body portion 24 is sheet-like in a plan view over a wider scope than the supporting portion 27. The protruding dimension of the supporting portion 27 is almost equal to the distance between the front side surface of the body portion 24 and the back side surface of the diffuser 15a, which is almost straight in the X-axis direction and the Y-axis direction. Accordingly, the supporting portion 27 is in contact with the almost straight diffuser 15a. The protruding front end of the supporting portion 27 as the contact place with the diffuser 15a is rounded. Since the supporting portion 27 is an only portion in the complex function-type holding member 20B, which protrudes from the body portion 24 toward the front side, in attaching the complex function-type holding member 20B to the chassis 14, the operator can use the supporting portion 27 as an operating portion. Thereby, attachment workability of the complex function-type holding member 20B can be improved.

Figure 14:
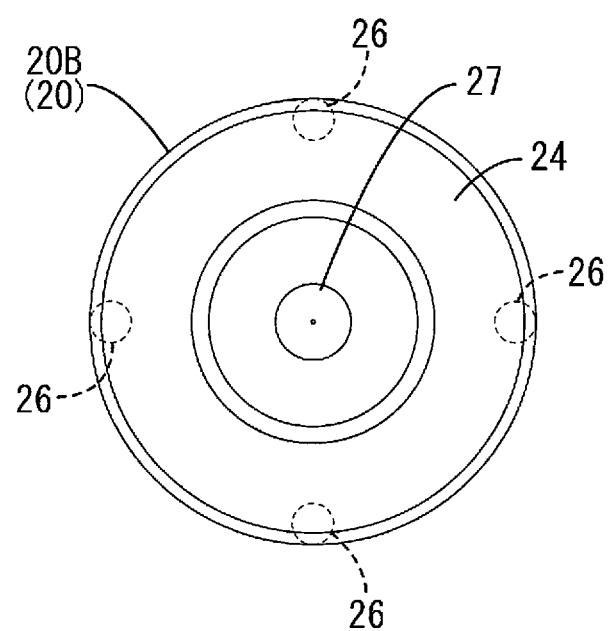
FIG. 14 is a plan view showing a complex function-type holding member.

As shown in FIGS. 14 and 15, the supporting portion 27 is located substantially at the center of the body portion 24. That is, the supporting portion 27 is located at such a position as to overlap the fixed portion 25 arranged on the back side in a plan view. Describing in more detail, the supporting portion 27 and the fixed portion 25 are located at such a position as to be concentric with each other in a plan view. With such arrangement, in attaching the complex function-type holding member 20B to the chassis 14, when the operator uses the supporting portion 27 as the operating portion, the operator can easily know the position of the fixed portion 25 hidden on the back side by visually recognizing the supporting portion 27 exposed on the front side. Accordingly, workability in inserting the fixed portion 25 into the communicating holes 22c, 23c, through hole 18b, and attachment hole 14e can be improved.

This embodiment has the above-mentioned configuration, and its action will be described. The liquid crystal display device 10 shown in FIGS. 4 and 5 is manufactured by separately manufacturing the liquid crystal panel 11 and the backlight unit 12 and assembling them by use of the bezel 13 or the like. Especially, the assembling operation in manufacturing the backlight unit 12 will be described in detail.

In this embodiment, prior to assembling of each constituent to the chassis 14, LEDs 17, the second reflection sheet 23 and the diffuser lenses 19 are attached to the LED substrate 18. Describing in detail, first, as shown in FIG. 10, after the LEDs 17 are mounted at predetermined positions on the LED substrate 18, the second reflection sheet 23 is attached to cover the front side. At this time, the LEDs 17 on the second reflection sheet 23 are inserted into the respective LED insertion holes 23a, and the through holes 18b, 23c in the LED substrate 18 and the second reflection sheet 23 are aligned and communicated to each other. After that, as shown in FIG. 11, the diffuser lenses 19 are attached to the LED substrate 18 so as to cover the respective LEDs 17. At this time, the attachment shaft portions 19d of the diffuser lenses 19 are fixedly adhered to the LED substrate 18 with an adhesive through the respective shaft portion insertion holes 23b in the second reflection sheet 23. In this manner, a so-called light source unit U formed by uniting the LEDs 17, the second reflection sheet 23 and the diffuser lenses 19 is manufactured on the LED substrate 18.

Subsequently, an assembling operation of each constituent to the chassis 14 will be described. First, the light source units U are stored from the front side of the chassis 14 through the openings 14b and are arranged at predetermined attachment positions on the bottom plate 14a. At this time, each through hole 18b on the LED substrate 18 in each light source unit U is aligned and communicated with each attachment hole 14e on the chassis 14.

Figure 16:
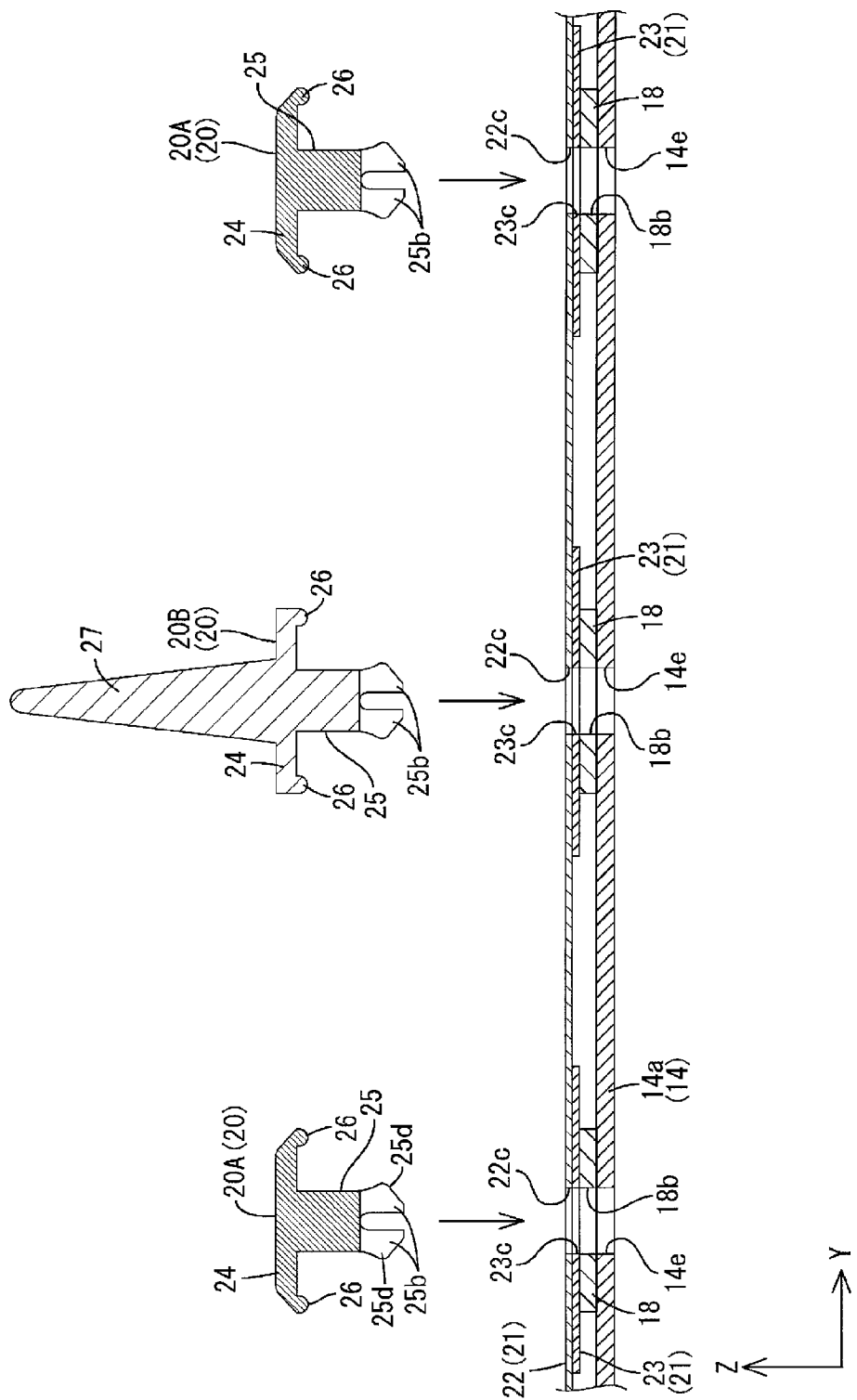
FIG. 16 is a sectional view taken along line ix-ix in FIG. 6 in the state prior to attachment of the holding members to the chassis.

Here, the adjacent LED substrates 18 in the X-axis direction are electrically connected to each other by fitting the adjacent connector portions 18a with each other. The operation of connecting the LED substrates 18 aligned in the X-axis direction to each other is not necessarily performed within the chassis 14, and may be performed outside of the chassis 14. When arrangement of all of the light source units U is completed, an operation of arranging the first reflection sheet 22 in the chassis 14 is performed. At this time, while positioning the lens insertion holes 22b of the first reflection sheet 22 with respect to the respective diffuser lenses 19 in each light source unit U, the diffuser lens 19 are passed through the respective lens insertion holes 22b (FIG. 3). When the first reflection sheet 22 is attached, the first reflection sheet 22 is placed from the front side onto almost all portions of the second reflection sheet 23 other than the overlapping portion with the diffuser lens 19 in a plan view (FIGS. 7 and 8). Especially, the edge of the lens insertion hole 22b of the first reflection sheet 22 is entirely placed on the front side of the second reflection sheet 23. Here, as shown in FIG. 16, the communicating hole 22c on the first reflection sheet 22 is aligned and communicated with the communicating hole 23c on the second reflection sheet 23, the through hole 18b on the LED substrate 18 and the attachment hole 14e on the chassis 14 in the X-axis direction. After that, the assembling operation of the holding member 20 is performed.

In assembling the holding member 20 to the chassis 14, for the complex function-type holding member 20B of the holding member 20, the supporting portion 27 can be used as an operating portion. With this configuration, in assembling the complex function-type holding member 20B, the operator can operate the complex function-type holding member 20B while holding the supporting portion 27. The complex function-type holding member 20B is stored from the front side of the chassis 14 through the opening 14b, and the fixed portion 25 hidden across the body portion 24 on the back side is inserted into the corresponding communicating holes 22c, 23c, through the hole 18b and the attachment hole 14e. At this time, since the supporting portion 27 and the fixed portion 25 are located so as to overlap and be concentric with each other in a plan view, the operator can easily recognize the position of the fixed portion 25. Accordingly, the fixed portion 25 can be smoothly inserted into each of the holes 14e, 18b, 22c and 23c. Matters related to assembling to the chassis 14, which are common to all holding members 20 including the single function-type holding member 20A, will be described below.

In assembling each holding member 20 (including the single function-type holding member 20A), when the fixed portion 25 is being inserted into each of the holes 14e, 18b, 22c and 23c, each elastic engaged portion 25b is elastically deformed once in such a manner as to be recessed in the grooved portion 25c. After that, when the fixed portion 25 is inserted until each elastic engaged portion 25b reaches the back side of the chassis 14, as shown in FIGS. 7 and 9, each elastic engaged portion 25b elastically returns and the engaging portion 25d is engaged with the edge of the attachment hole 14e from the back side. Thereby, the holding member 20 is prevented from being detached from the chassis 14 and is fixed to the attached state. In this state, the LED substrate 18 and the reflection sheets 22, 23 are sandwiched together between the body portion 24 of the holding member 20 and the bottom plate 14a of the chassis 14.

During the process in which the holding member 20 returns to the attached state as described above, when each elastic engaged portion 25b elastically returns, each contact portion 26 provided at the body portion 24 contacts the front side surface of the first reflection sheet 22. Accordingly, in the attached state, the spherical circumferential surface of each contact portion 26 is in point contact with the first reflection sheet 22, while the back side surface of the body portion 24 (surface opposite to the first reflection sheet 22) floats from the first reflection sheet 22 in the non-contact state, and the gap C corresponding to the protruding dimension of the contact portion 26 is held between the front side surface of the body portion 24 and the front side surface of the first reflection sheet 22. Accordingly, the contact area of the holding member 20 with the first reflection sheet 22 is very small and as compared to the case where the entire back side surface of the body portion is in contact, the contact area is reduced. Conversely speaking, this means that the area of the non-contact part of the first reflection sheet 22 with the holding member 20 (the part that is not pressed by the holding member 20) increases. In the attached state, the holding member 20 is stably supported by the four contact portions 26 located at symmetrical positions at intervals of about 90 degrees. Describing in more detail, since the contact portions 26 is arranged at the outer edge of the body portion 24, the contact portions 26 are located at a position overlapping the outer edge of the LED substrate 18 in the short-side direction in a plan view. Accordingly, the outer edge of the LED substrate 18 in the short-side direction is pressed from the front side by the contact portions 26. The first reflection sheet 22 is directly pressed by the contact portions 26 and the second reflection sheet 23 and the LED substrate 18 are indirectly pressed by the contact portion 26 through the first reflection sheet 22.

Since the fixed portion 25 passes through the reflection sheets 22, 23 and the LED substrate 18, the reflection sheets 22, 23 and the LED substrate 18 are prevented from carelessly moving in the X-axis direction and the Y-axis direction, thereby being positioned in these directions. Further, since the fixed portion 25 achieves fixation by passing through the attachment hole 14e formed on the chassis 14 and mechanically engaging there, as compared to the case of adopting fixing means such as the adhesive, fixation can be achieved more easily at lower costs and the holding member 20 can be detached at the time of maintenance and disposal.

As shown in FIG. 3, the holding members 20 thus attached are arranged at different plural places in the long-side direction (X-axis direction) on each LED substrate 18. Thereby, each LED substrate 18 can be stably held. Further, the body portion 24 of the holding member 20 is arranged so as to pass between the adjacent LEDs 17 (the diffuser lenses 19) on the LED substrate 18 as shown in FIG. 7, it is prevented to disturb light emitted from the LED 17.

After that, the optical member 15 is attached to the chassis 14 so as to cover the openings 14b. According to the specific attaching order of the optical member 15, the diffuser 15a, and then, the optical sheets 15b are attached. The optical member 15, as shown in FIGS. 4 and 5, is received by the receiving plates 14d of the chassis 14 at its outer circumference, and is supported by the supporting portion 27 of the complex function-type holding member 20B at its central part. Then, when the frame 16 is attached to the chassis 14, the outer circumference of the optical member 15 is pinched between the frame 16 and the receiving plates 14d. Thereby, manufacturing of the backlight unit 12 is completed. In assembling the manufactured backlight unit 12 and the liquid crystal panel 11, the liquid crystal panel 11 is placed on the frame 16 and then, the bezel 13 is covered on the front side, and they are screwed together. Thereby, the liquid crystal panel 11 is pinched between the frame 16 and bezel 13 and becomes integral with the backlight unit 12, resulting in that manufacturing of the liquid crystal display device 10 is completed.

In using the liquid crystal display device 10 manufactured as described above, each of the LEDs 17 provided in the backlight unit 12 is lighted and an image signal is supplied to the liquid crystal panel 11, thereby displacing a predetermined image on a display screen of the liquid crystal panel 11. As shown in FIGS. 7 and 8, light emitted to light each of the LEDs 17 is first incident on the light incidence surface 19a of the diffuser lens 19. At this time, most of light is incident on an inclined surface of the light incidence-side concave portion 19c of the light incidence surface 19a and thus, into the diffuser lens 19 while being refracted with a wide angle according to the inclined angle. Then, the incident light propagates in the diffuser lens 19 and is emitted from the light emitting surface 19b. However, since the light emitting surface 19b is a substantially flat spherical surface, light is emitted while being further refracted at a boundary with the external air layer with a wider angle. Moreover, since the substantially bowl-like light-emitting side concave portion 19e is formed in a region where the amount of light from the LED 17 is the largest in the light emitting surface 19b, and its circumferential surface is a substantially flat spherical surface, light can be emitted while being refracted at the circumferential surface of the light-emitting side concave portion 19e with a wide angle, or can be reflected toward the LED substrate 18. Since light returned to the LED substrate 18 is reflected toward the diffuser lens 19 by the second reflection sheet 23 and is incident on the diffuser lens 19 once, high brightness can be obtained.

Since the highly directive light emitted from the LED 17 can be diffused with a wide angle by the diffuser lens 19, in-plane distribution of the light reaching the optical member 15 can be made uniform. In other words, since the region between the adjacent LEDs 17 becomes hard to be visually recognized as the dark place by using the diffuser lens 19, the interval between the LEDs 17 can be increased, thereby reducing the number of installed LEDs 17 while suppressing uneven brightness. Then, since the interval between the adjacent LEDs 17 can be increased by reducing the number of installed LEDs 17, the holding member 20 can be located in the wider region, and furthermore, the holding member 20 can fix the LED substrate 18.

Each LED 17 generates heat during lighting. Most of heat emitted from the LEDs 17 is propagated to the chassis 14 through the LED substrate 18 that mounts the LEDs 17 thereon, and then, is radiated to air outside of the liquid crystal display device 10. Considering heat radiation efficiency at this time, as closeness between the LED substrate 18 and the chassis 14 is higher, their heat transfer property improves. Conversely, as closeness between the LED substrate 18 and the chassis 14 is lower, their heat transfer property lowers, resulting in a tendency of lower heat radiation efficiency. In this embodiment, in order to improve heat radiation efficiency, the LED substrate 18 is fixed to the chassis 14 by means of the holding member 20 and the following configuration is adopted. That is, since the outer edge of the LED substrate 18 in the short-side direction is pressed from the front side by the contact portions 26 of the holding member 20, the LED substrate 18 is stably held in close contact with the chassis 14. Moreover, since the holding member 20 has the fixed portion 25 at the center of the body portion 24 and the contact portions 26 at the outer edge of the body portion 24, the LED substrate 18 is pressed by the central fixed portion 25 from the back side as well as by the contact portions 26 at the outer edge from the front side and thus, is stably held in a well-balanced manner. Further, since the contact portions 26 are located at the body portion 24 at regular intervals, the LED substrate 18 can be stably pressed in a well-balanced manner. As described above, since the LED substrate 18 is stably fixed to the chassis 14 in close contact with each other by means of the holding member 20, heat transfer property to the chassis 14 is extremely high and therefore, heat can be efficiently radiated. Accordingly, since temperature inside the backlight unit 12 is hard to become high, light emission efficiently of the LEDs 17 is prevented from lowering and thus, high brightness can stably be obtained.

In using the liquid crystal display device 10 as described above, since each of the LEDs 17 in the backlight unit 12 is lighted on or off, internal temperature environment changes and thus, each constituent of the liquid crystal display device 10 may be thermally expanded or thermally contracted. In the case where the first reflection sheet 22 and the second reflection sheet 23 among the constituents are thermally expanded or thermally contracted, when local deformation such as wrinkle or flexure is generated, unevenness is easy to occur in reflected light and uneven brightness occurs in light emitted from the backlight unit 12, possibly exerting a negative effect on display quality. Further, in the case where the LED substrate is thermally expanded or thermally contracted, when local deformation such as warp and flexure is generated, contact failure occurs in the connector portions 18a, resulting in deficiency in controlling of lighting of the LED 17. Such local deformation that can occur in the reflection sheets 22, 23 and the LED substrate 18 is easy to occur in proportion to magnitude of the pressing forces acted by the chassis 14 and the holding member 20 and the pressed area (contact area), and in order to suppress such local deformation, it is preferable to reduce the pressing forces or the pressed area.

Thus, in this embodiment, as shown in FIG. 9, by providing the contact portions 26 at the holding member 20 and bringing the contact portions 26 of the holding member 20 into point contact with the first reflection sheet 22, the contact area with the first reflection sheet 22 is reduced. When the contact area is reduced, in the reflection sheets 22, 23 and the LED substrate 18, a part that is pressed by the holding member 20 (part overlapping with the contact points of the contact portions 26 in a plan view) decreases and a part that is not pressed by the holding member 20 (part that is not in overlap with the contact points of the contact portions 26 in a plan view) increases. The part pressed by the holding member 20 is relatively easy to be restricted in expansion or contraction due to thermal expansion or thermal contraction (the degree of flexibility in expansion or contraction is low), while the part that is not pressed by the holding member 20 is relatively easy to be allowed in expansion or contraction due to thermal expansion or thermal contraction (the degree of flexibility in expansion or contraction is high). In this embodiment, since the unpressed area is increased, the reflection sheets 22, 23 and the LED substrate 18 as a whole are easy to thermally expand or contract, and flexure or warp that can be caused by expansion or contraction is preferably absorbed by the unpressed part. As a result, flatness as a whole is kept and thus, local flexure or warp in the reflection sheets 22, 23 and the LED substrate 18 is suppressed.

Moreover, the contact portions 26 are located at a position in the body portion 24 away from the fixed portion 25. The contact portions 26 apply the pressing forces to the reflection sheets 22, 23 and the LED substrate 18 from the front side (body portion 24), while the fixed portion 25 applies the pressing forces to the reflection sheets 22, 23 and the LED substrate 18 from the back side (chassis 14 side). Accordingly, by locating the contact portions 26 and the fixed portion 25 so as to be shifted (offset) from each other in a plan view, in the reflection sheets 22, 23 and the LED substrate 18, the position where the pressing forces are applied from the front side (positions of the contact portions 26) and the positions where the pressing forces are applied from the back side (position of the engaging portion 25d) are similarly shifted from each other. Accordingly, it is prevented that stress applied to the reflection sheets 22, 23 and the LED substrate 18 from the front side and the back side is concentrated. Thus, since the pressing forces exerted on the reflection sheets 22, 23 and the LED substrate 18 are prevented from increasing, the phenomenon that the degree of flexibility in expansion or contraction of the part pressed by the holding member 20 becomes extremely low can be prevented, and the degree of flexibility in expansion or contraction of the reflection sheets 22, 23 and the LED substrate 18 can be improved.

Figure 17:
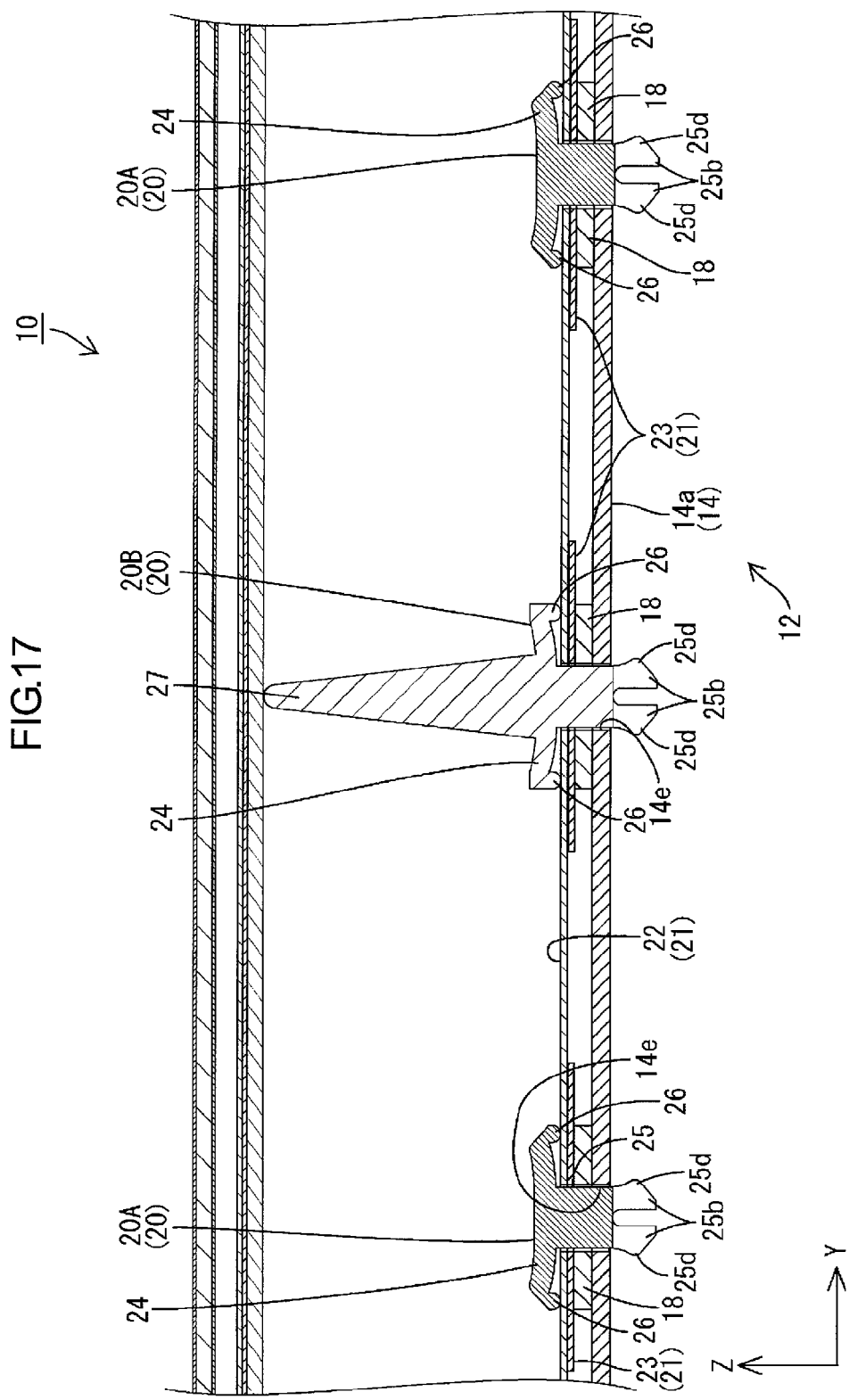
FIG. 17 is a sectional view taken along line ix-ix in FIG. 6, which shows the state where the holding member is attached to the chassis and the body portion is elastically deformed.

Furthermore, by locating the contact portions 26 at a position in the body portion 24 away from the fixed portion 25, following functions and effects can be obtained. That is, when dimensional error occurs in manufacturing of the holding member 20, for example, when the protruding dimension of each contact portion 26 from the body portion 24 exceeds a set value or the length of the fixed portion 25 falls below a set value, the pressing forces exerted on the reflection sheets 22, 23 and the LED substrate 18 may excessively become large (than required). Then, in this embodiment, since some elasticity is imparted to the part of the body portion 24 from the fixed portion 25 to each contact portion 26, as shown in FIG. 17, the part of the body portion 24 from the fixed portion 25 to each contact portion 26 is elastically deformed to accommodate possible increasing pressing forces. Thereby, it can be prevented that excessive pressing forces are applied from the contact portions 26 to the reflection sheets 22, 23 and the LED substrate 18. Thus, the degree of flexibility in expansion or contraction of the reflection sheets 22, 23 and the LED substrate 18 can be ensured.

As described above, the backlight unit 12 according to this embodiment includes the LEDs 17 as light sources, the chassis 14 that stores the LEDs 17, the reflection sheet 21 and the LED substrate 18 as the extending members extending along the inner surface of the chassis 14 and the holding member 20 that sandwiches the reflection sheet 21 and the LED substrate 18 between the holding member 20 and the chassis 14 and is fixed to the chassis 14, and the holding member 20 is provided with the contact portions 26 that protrude toward the reflection sheet 21 and the LED substrate 18 and are in contact with the reflection sheet 21 and the LED substrate 18.

With this configuration, when the holding member 20 is fixed to the chassis 14, the reflection sheet 21 and the LED substrate 18 are held with being sandwiched between the holding member 20 and the chassis 14. Since the holding member 20 is provided with the contact portions 26 protruding toward the reflection sheet 21 and the LED substrate 18, and the contact portions 26 are in contact with the reflection sheet 21 and the LED substrate 18, as compared to the case where the entire opposite surface of the holding member to the reflection sheet 21 contacts the reflection sheet 21, the contact area of the holding member 20 with the reflection sheet 21 can be reduced. Conversely speaking, since the reflection sheet 21 and the LED substrate 18 are not in contact with the holding member 20, the area of the part that is not pressed by the holding member 20 increases. The unpressed part is easier to expand or contract when thermal expansion or thermal contraction occurs due to change in the thermal environment than the part that is in contact with the holding member 20 and is pressed by the holding member 20. When the area of the unpressed part increases, the degree of flexibility in expansion or contraction of the reflection sheet 21 and the LED substrate 18 as a whole is improved, thereby preventing local deformation such as flexure or warp due to expansion or contraction.

By reducing the contact area of the holding member 20 with the reflection sheet 21 as described above, the thermally expanded or contacted reflection sheet 21 and LED substrate 18 can easily slide with respect to the contact parts (contact portions 26) of the holding member 20 and thus, the degree of flexibility in expansion or contraction of the reflection sheet 21 and the LED substrate 18 can be improved.

The holding member 20 includes the body portion 24 that sandwiches the reflection sheet 21 and the LED substrate 18 between the body portion 24 and the chassis 14 and the fixed portion 25 that protrudes from the body portion 24 toward the chassis 14 and is fixed to the chassis 14, and the contact portions 26 are provided at the body portion 24. With this configuration, when the fixed portion 25 is fixed to the chassis 14, the reflection sheet 21 and the LED substrate 18, which are sandwiched between the body portion 24 and the chassis 14, are preferably held. At this time, the contact portions 26 are in contact with the reflection sheet 21, thereby preventing contact of the entire opposite surface of the body portion 24 to the reflection sheet 21.

The contact portions 26 are located at a position in the body portion 24 away from the fixed portion 25. With this configuration, when the holding member 20 is fixed to the chassis 14, pressing forces from both the chassis 14 and the body portion 24 act on the reflection sheet 21 and the LED substrate 18. Here, the position in the reflection sheet 21 and the LED substrate 18, on which the pressing force from the chassis 14 acts, and the position in the reflection sheet 21 and the LED substrate 18, on which the pressing force from the body portion 24 acts, depend on positional relationship between the contact portion 26 and the fixed portion 25. In this embodiment, since the contact portions 26 are located at a position in the body portion 24 away from the fixed portion 25, the position in the reflection sheet 21 and the LED substrate 18, on which the pressing force from the chassis 14 acts, and the position in the reflection sheet 21 and the LED substrate 18, on which the pressing force from the body portion 24 acts, are shifted (offset) from each other in a plan view. Accordingly, for example, as compared to the case where the positions of the reflection sheet 21 and the LED substrate 18, on which the pressing forces act, are the same in a plan view, stress exerted on the reflection sheet 21 and the LED substrate 18 can be dispersed, and stress concentration can be mitigated. Thereby, the degree of flexibility in expansion or contraction of the reflection sheet 21 and the LED substrate 18 can be improved.

In the case where the dimensional error occurs in manufacturing of the holding member 20, for example, when the protruding dimension of the contact portions 26 from the body portion 24 exceeds the set value, the pressing forces exerted on the reflection sheet 21 and the LED substrate 18 may become excessively large. Even in such case, since the contact portions 26 are located at a position in the body portion 24 away from the fixed portion 25, the part of the body portion 24 from the fixed portion 25 to the contact portions 26 is elastically deformable to accommodate the possibly increasing pressing forces. As a result, it can be prevented that excessive pressing forces are applied from the contact portions 26 to the reflection sheet 21 and the LED substrate 18 and thus, the degree of flexibility in expansion or contraction of the reflection sheet 21 and the LED substrate 18 can be ensured.

The fixed portion 25 is located at the center of the body portion 24, while the contact portions 26 are located at outer edge of the body portion 24. With this configuration, by locating the fixed portion 25 at the center of the body portion 24, the holding member 20 can be stably fixed to the chassis 14. In addition, since the distance between the fixed portion 25 and each contact portion 26 can be ensured to be maximum by locating the contact portions 26 at the outer edge of the body portion 24, stress concentration can be mitigated more suitably and thus, the degree of flexibility in expansion or contraction of the reflection sheet 21 and the LED substrate 18 can be improved further. Further, since the body portion 24 is elastically deformable more easily by ensuring the distance between the fixed portion 25 and each contact portion 26, the range for accommodating the dimensional error occurring in manufacturing of the holding member 20 can be increased and thus, the degree of flexibility in expansion or contraction of the reflection sheet 21 and the LED substrate 18 can be ensured more stably.

The fixed portion 25 is located at the center of the body portion 24, while at least a pair of contact portions 26 are located at the body portion 24 across the fixed portion 25. With this configuration, by locating the fixed portion 25 at the center of the body portion 24, the holding member 20 can be stably fixed to the chassis 14. In addition, since at least a pair of contact portions 26 are located across the fixed portion 25, pressing forces can be exerted on the reflection sheet 21 and the LED substrate 18 in a well-balanced manner and thus, the reflection sheet 21 and the LED substrate 18 can be properly held while improving the degree of flexibility in expansion or contraction of the reflection sheet 21 and the LED substrate 18.

The contact portions 26 are located at positions symmetrical with each other about the fixed portion 25. With this configuration, pressing forces can be exerted on the reflection sheet 21 and the LED substrate 18 in a more balanced manner.

The fixed portion 25 is fixed to the chassis 14 through the reflection sheet 21 and the LED substrate 18. With this configuration, the reflection sheet 21 and the LED substrate 18 can be positioned in the direction along the plate surface by the fixed portion 25 passing through the reflection sheet 21 and the LED substrate 18.

The fixed portion 25 passes through the reflection sheet 21, the LED substrate 18 and the chassis 14, and is engaged with the chassis 14 from the side opposite to the reflection sheet 21 and the LED substrate 18. With this configuration, by engaging fixed portion 25 passing through the reflection sheet 21, the LED substrate 18 and the chassis 14 with the chassis 14, the holding member 20, the reflection sheet 21 and the LED substrate 18 can be fixed and thus, fixation can be easily achieved at low costs without using other fixing means such as adhesive.

The optical member 15 is located opposite to each LED 17, and the body portion 24 in the complex-type holding member 20B is provided with the supporting portion 27 that protrudes toward the optical member 15 and supports the optical member 15. With this configuration, the complex function-type holding member 20B for fixing the reflection sheet 21 and the LED substrate 18 can also have a function of supporting the optical member 15.

The fixed portion 25 and the supporting portion 27 are located at a position overlapping with each other in a plan view. With this configuration, when the operator attaches the complex function-type holding member 20B while holding the supporting portion 27, the position of the fixed portion 25 can be easily recognized, which is excellent in workability.

The fixed portion 25 and the supporting portion 27 are located at such a position as to be concentric with each other. With this configuration, workability is more excellent.

The contact portions 26 each are point in a plan view. With this configuration, the contact portions 26 are in point contact with the reflection sheet 21, the contact area can be reduced to the minimum and thus, the degree of flexibility in expansion or contraction of the reflection sheet 21 and the LED substrate 18 can be improved.

The contact surface of each contact portion 26 with the reflection sheet 21 and the LED substrate 18 is formed of a curved surface. With this configuration, the reflection sheet 21 can easily slide with respect to the contact portions 26 and thus, the degree of flexibility in expansion or contraction can be improved further.

The contact surface of each contact portion 26 is formed of a spherical surface. With this configuration, the reflection sheet 21 and the LED substrate 18 can slide with respect to the contact portions 26 more easily and thus, the degree of flexibility in expansion or contraction can be improved further.

The extending member is the LED substrate 18 having the LEDs 17. With this configuration, since the degree of flexibility in expansion or contraction caused by thermal expansion or thermal contraction of the LED substrate 18 is improved, a contact failure is hard to occur in a connection place with an external circuit or the like, and deficiency in controlling lighting of the LED 17 can be prevented.

The plurality of LED 17 is arranged on the LED substrate 18 in parallel. With this configuration, the plurality of LED 17 can be efficiently arranged on the LED substrate 18, which is suitable for higher brightness.

The holding member 20 is arranged between the adjacent LEDs 17. With this configuration, space between the adjacent LEDs 17 can be efficiently used. Further, it is prevented the holding member 20 from disturbing light emitted from the LEDs 17.

The extending member is the reflection sheet 21 reflecting from the LED 17. With this configuration, by reflecting light by the reflection sheet 21, light can be effectively used, which is preferable to improvement of brightness. Since the degree of flexibility in expansion or contraction of the reflection sheet 21 due to thermal expansion or thermal contraction is improved, unevenness is hard to generate in the light reflected by the reflection sheet 21.

The extending member is constituted of the LED substrate 18 having the LEDs 17 and the reflection sheet 21 reflecting light from the LEDs 17, and the LED substrate 18 and the reflection sheet 21 are sandwiched between the holding member 20 and the chassis 14 in the laminated state. With this configuration, the LED substrate 18 and the reflection sheet 21 can be held together by the holding member 20. In addition, the degree of flexibility in expansion or contraction of both the LED substrate 18 and the reflection sheet 21 due to thermal expansion or thermal contraction is improved.

The reflection sheet 21 is arranged on the LED substrates 18 on the side opposite to the chassis 14, and has the lens insertion holes 22b and the LED insertion holes 23a, into which the LEDs 17 are inserted, at positions where these holes overlap the LEDs 17 in a plan view. With this configuration, since light is reflected by the reflection sheet 21 located on the LED substrate 18 on the side opposite to the chassis 14, light can be used more efficiently, which is suitable for improvement of brightness. Further, since the reflection sheet 21 includes the lens insertion hole 22b and the LED insertion hole 23a, it is prevented to disturb light emission from the LED 17.

The diffuser lenses 19 diffusing light from the LEDs 17 are located at such a position as to overlap the LEDs 17 in a plan view on the LED substrate 18 on the side opposite to the chassis 14. With this configuration, light emitted from the LEDs 17 can be diffused by the diffuser lenses 19 and then, emitted. Thereby, unevenness in the emitted light is hard to occur.

The reflection sheet 21 is constituted of the first reflection sheet 22 including the lens insertion hole 22b that can pass the diffuser lens 19 therethrough, and the second reflection sheet 23 that is interposed between the LED substrate 18 and the diffuser lens 19, is located at such a position as to overlap the lens insertion hole 22b provided in the first reflection sheet 22 in a plan view (arranged in the lens insertion hole 22b in a plan view) and reflects light toward the diffuser lens 19. With this configuration, even when the first reflection sheet 22 is provided with the lens insertion hole 22b that can pass the diffuser lens 19 therethrough, light can be reflected toward the diffuser lens 19 by the second reflection sheet 23 located at such a position as to overlap the lens insertion hole 22b (arranged in the lens insertion hole 22b in a plan view). As a result, light can be efficiently utilized, which is preferable for improvement of brightness.

The edge of the lens insertion hole 22b of the first reflection sheet 22 and the second reflection sheet 23 are formed at a position overlapping with each other in a plan view. With this configuration, the edge of the lens insertion hole 22b of the first reflection sheet 22 and the second reflection sheet 23 are connected to each other in a plan view without any gap. Thus, light can be used more efficiently.

Although the first embodiment of the present invention has been described, the present invention is not limited to this embodiment, and may include, for example, following modification examples. The same members in each of the following modification examples as those in the first embodiment are given the same reference numerals and illustration and description thereof may be omitted.

First Modification Example of First Embodiment

A first modification example of the first embodiment will be described with reference to FIGS. 18 to 20. Here, a contact portion 26-1 of modified shape is shown.

Figure 18:
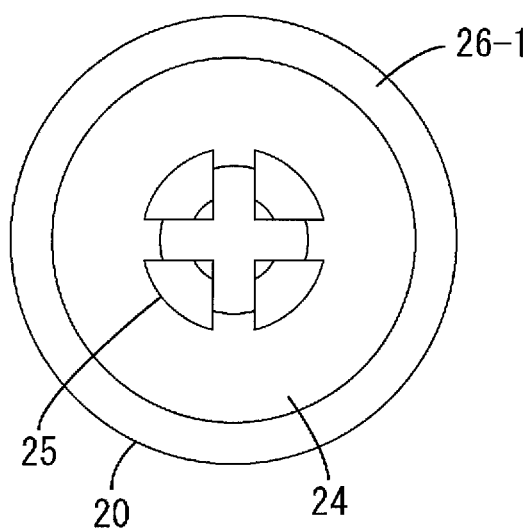
FIG. 18 is a bottom view showing the holding member according to a first modification example of the first embodiment.
Figure 19:
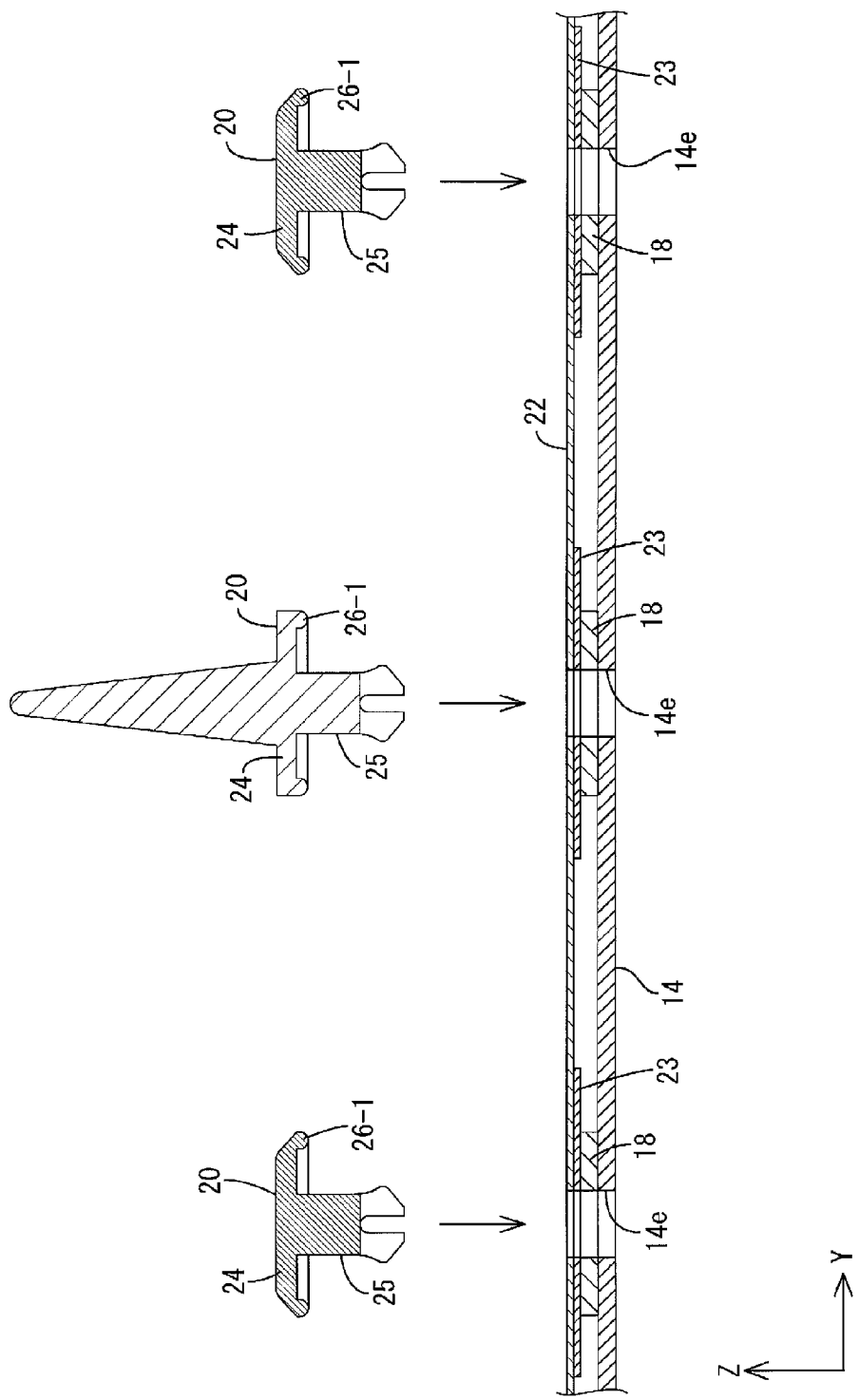
FIG. 19 is a sectional view showing the state prior to attachment of the holding member to the chassis.
Figure 20:
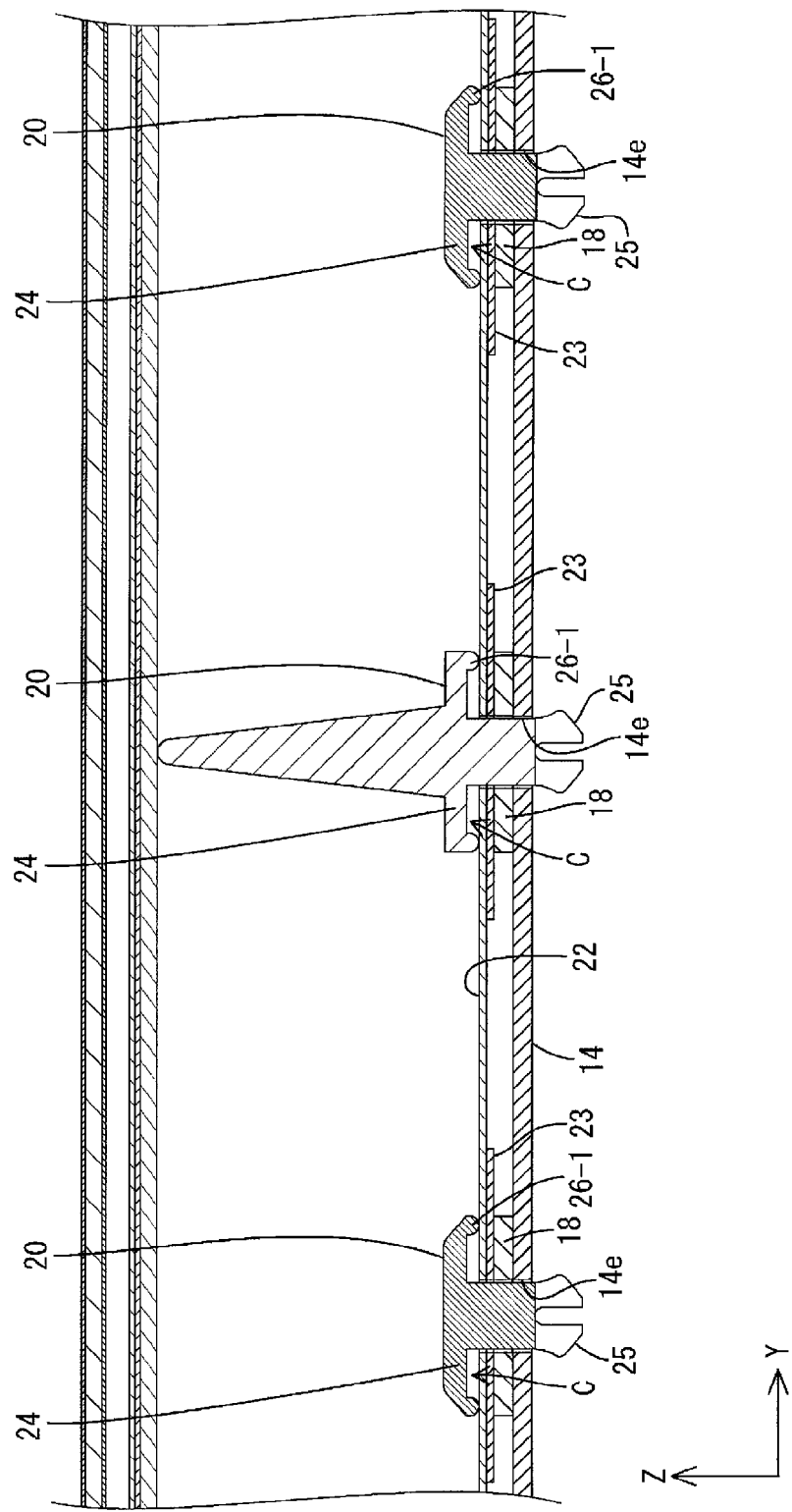
FIG. 20 is a sectional view showing the state where a holding member is attached to the chassis.

As shown in FIGS. 18 and 19, the contact portion 26-1 is annularly formed in such a manner as to surround the central fixed portion 25 in the body portion 24. Describing in detail, the contact portion 26-1 is annular and extends along the outer edge of the body portion 24. In other words, the contact portion 26-1 is a line forming a circle in a plan view and is shaped like an endless ring. The contact portion 26-1 has a semicircular cross section and its contact surface with the first reflection sheet 22 is a spherical surface. When the holding member 20 in a state shown in FIG. 19 is attached to the chassis 14, the holding member 20 is put into a state shown in FIG. 20. At this time, since the annular contact portion 26-1 entirely surrounds the gap C held between the body portion 24 and the first reflection sheet 22, the gap C is prevented from being opened into the chassis 14. Accordingly, light in the chassis 14 is prevented from leaking to the gap C, thereby preventing light from leaking outside of the chassis 14 from a small gap held between the fixed portion 25 and the attachment hole 14e on the chassis 14 through the gap C.

As described above, in this modification example, the fixed portion 25 is located at the center of the body portion 24, while the contact portion 26-1 is annularly in such a manner as to surround the fixed portion 25. With this configuration, by locating the fixed portion 25 at the center of the body portion 24, the holding member 20 can be stably fixed to the chassis 14. In addition, since the annular contact portion 26-1 surrounding the fixed portion 25 is in contact with the first reflection sheet 22, the reflection sheets 22, 23 and the LED substrate 18 can be held more suitably in a balanced manner. Moreover, since the gap C held between the body portion 24 and the first reflection sheet 22 is surrounded by the annular contact portion 26-1, the gap C is prevented from being opened into the chassis 14. Accordingly, light in the chassis 14 can be prevented from leaking to the gap C. Further, for example, when the gap is formed between fixed portion 25 and the chassis 14 (attachment hole 14e), light in the chassis 14 can be prevented from leaking outside of the chassis 14 through the gap C.

The contact portion 26-1 is linear in a plan view. With this configuration, since the contact portion 26-1 is in line contact with the first reflection sheet 22, the reflection sheets 22, 23 and the LED substrate 18 can be suitably held while reducing the contact area with the first reflection sheet 22.

Second Modification Example of First Embodiment

Figure 22:
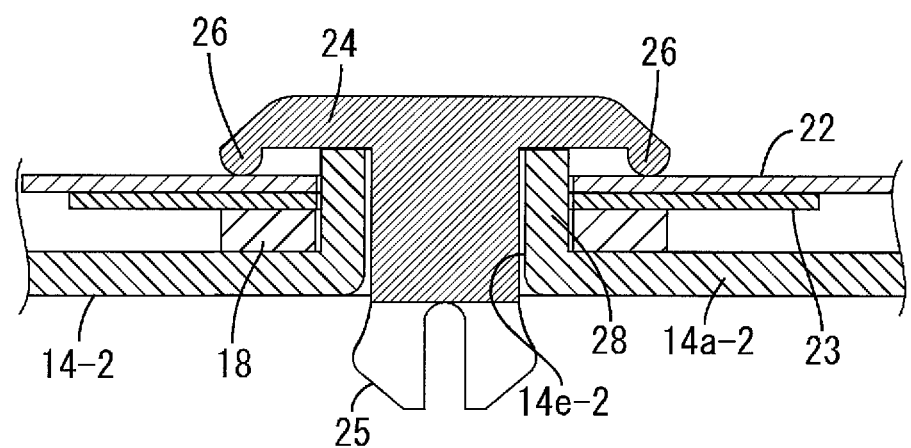
FIG. 22 is a sectional view showing the state where the contact portion is in contact with a first reflection sheet.

A second modification example of the first embodiment will be described with reference to FIGS. 21 and 22. Here, a modification of the chassis 14-2 of is shown.

As shown in FIG. 21, a restricting member 28 that protrudes toward the front side and can be in contact with the body portion 24 from the back side is provided at an edge of an attachment hole 14e-2 on a chassis 14-2. The restricting member 28 is arranged on the entirety of the edge of the attachment hole 14e-2 and is shaped like a short cylinder as a whole. The outer diameter of the restricting member 28 is larger than the fixed portion 25, and each of the holes 18b, 22c and 23c on the reflection sheets 22, 23 and the LED substrate 18 has such a dimension that allows insertion of the restricting member 28. The protruding dimension of the restricting member 28 from a bottom plate 14a-2 is larger than a sum of thicknesses of the reflection sheets 22, 23 and the LED substrate 18. Accordingly, when the holding member 20 is attached to the chassis 14-2, the body portion 24 and the contact portion 26 are supported away from the first reflection sheet 22 by the restricting member 28. That is, positional relationship between the holding member 20 and the first reflection sheet 22 in the Z-axis direction is restricted by the restricting member 28 and the holding member 20 is kept so as not to be in contact with the first reflection sheet 22. With this configuration, the pressing force from the holding member 20 does not directly act on the reflection sheets 22, 23 and the LED substrate 18 and thus, the degree of flexibility in expansion or contraction of the reflection sheets 22, 23 and the LED substrate 18 due to thermal expansion or thermal contraction can be made extremely high.

However, the result of the manufactured holding member 20 is not necessarily constant, causing some dimensional errors. Depending on the result, even when the restricting member 28 restricts positional relationship of the holding member 20 with respect to the first reflection sheet 22, the holding member 20 can contact the first reflection sheet 22. Even in such situation, in this embodiment, since the body portion 24 has the contact portion 26, as shown in FIG. 22, only the contact portion 26 is in contact with the first reflection sheet 22, and it is prevented that the body portion 24 is entirely in contact with the first reflection sheet 22. Thereby, the degree of flexibility in expansion or contraction of the reflection sheets 22, 23 and the LED substrate 18 due to thermal expansion or thermal contraction can be kept high.

As described above, in this modification example, the restricting member 28 restricting positional relationship of the holding member 20 with respect to the first reflection sheet 22 so that the gap C is ensured between the holding member 20 and the first reflection sheet 22 is provided. With this configuration, since the restricting member 28 restricts positional relationship of the holding member 20 with respect to the first reflection sheet 22 so that the gap is held between the holding member 20 and the first reflection sheet 22, the reflection sheets 22, 23 and the LED substrate 18 are easy to expand or contract due to thermal expansion or thermal contraction. However, although the gap cannot be held depending on the result of the manufactured holding member 20, even in this case, the contact portion 26 is in contact with the first reflection sheet 22, and therefore, as compared to the case where the entire opposite surface of the holding member to the first reflection sheet 22 is in contact with the first reflection sheet 22, the degree of flexibility in expansion or contraction of the reflection sheets 22, 23 and the LED substrate 18 can be kept higher.

Third Modification Example of First Embodiment

A third modification example of the first embodiment will be described with reference to FIG. 23. Here, a restricting member 28-3 modified from the restricting member in the second modification example is shown. Configuration, functions and effects of the restricting member 28-3 are the same as those in second modification example and thus, overlapping description thereof is omitted.

As shown in FIG. 23, the restricting member 28-3 is provided integrally with the holding member 20. Describing in detail, the restricting member 28-3 is located adjacent to the fixed portion 25 of the body portion 24 in the holding member 20. The restricting member 28-3 is connected to the body portion 24 and a bottom portion 25a of the fixed portion 25. The restricting member 28-3 surrounds the bottom portion 25a. When the holding member 20 is attached to the chassis 14, an opposite surface of the restricting member 28-3 to the chassis 14 is in contact with the edge of the attachment hole 14e on the chassis 14, so that the body portion 24 and the contact portion 26 are supported at the position away from the first reflection sheet 22 (non-contact position). As described above, positional relationship between the holding member 20 and the first reflection sheet 22 in the Z-axis direction is restricted by the restricting member 28-3.

Second Embodiment

A second embodiment of the present invention will be described with reference to FIG. 24 or FIG. 25. In the second embodiment, a contact portion 126 having modified structure is shown. Description of the same configuration, actions and effects as those in the first embodiment is omitted.

Figure 24:
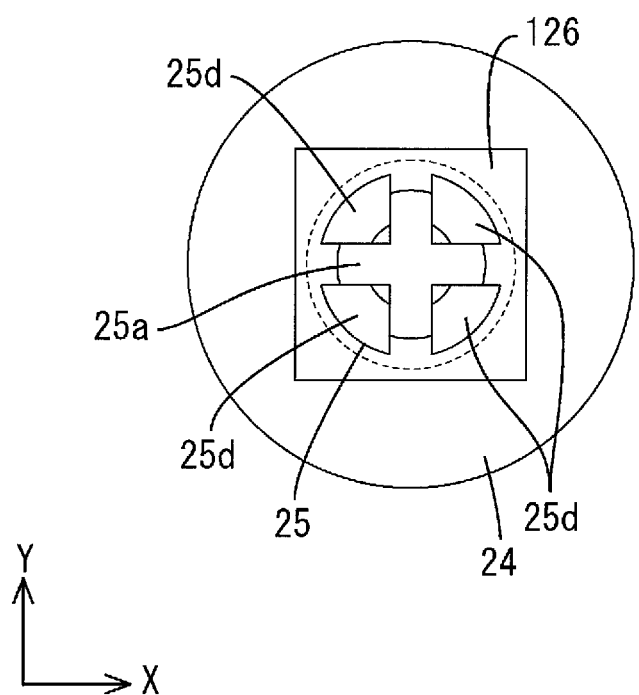
FIG. 24 is a bottom view showing the holding member according to a second embodiment of the present invention.
Figure 25:
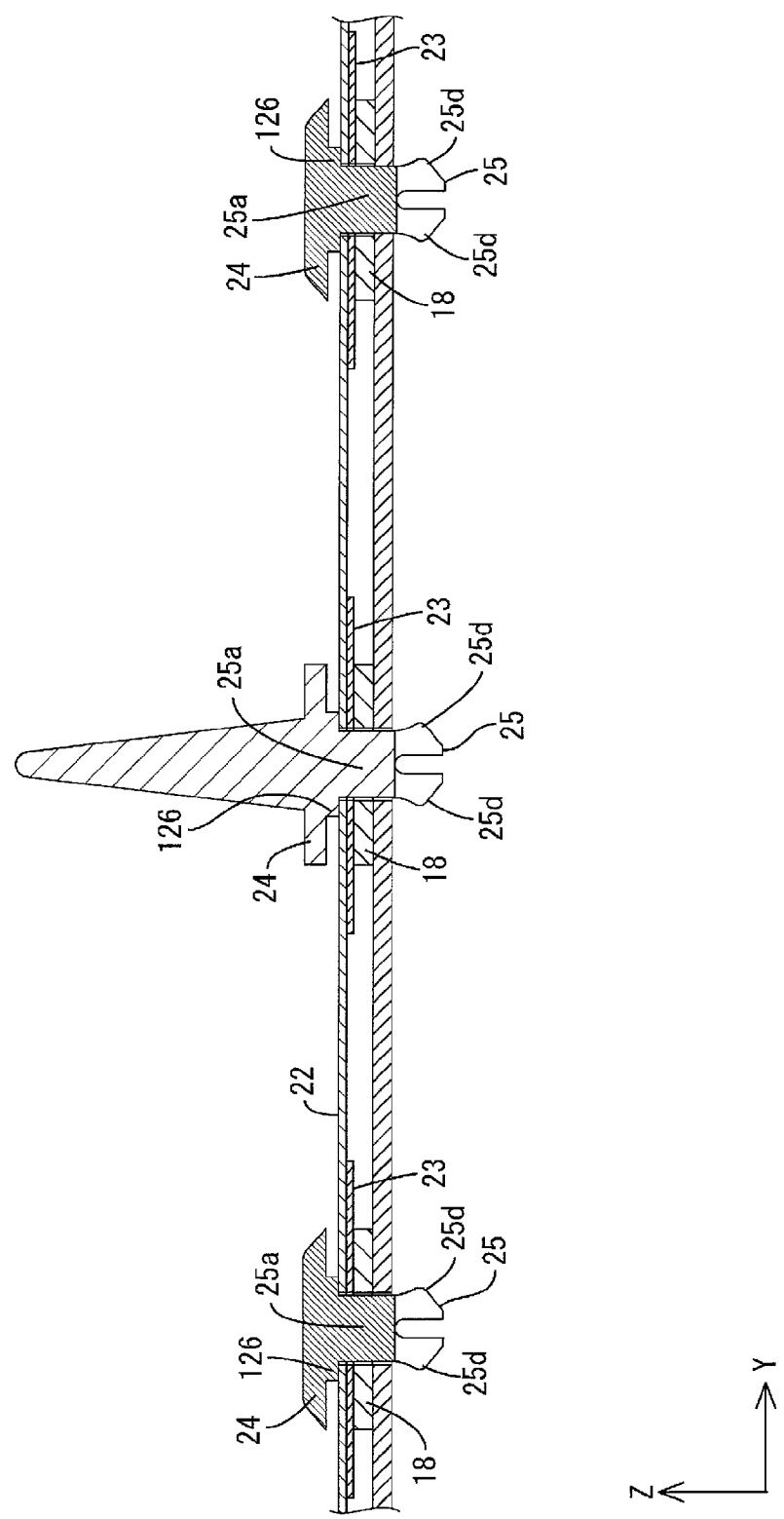
FIG. 25 is a sectional view showing the state where the holding member is attached to the chassis.

As shown in FIGS. 24 and 25, the contact portion 126 is located adjacent to the fixed portion 25 of the body portion 24. The contact portion 126 entirely surrounds the bottom portion 25a of the fixed portion 25 and is coupled to the bottom portion 25a. That is, in the bottom portion 25a of the fixed portion 25, a coupling bottom end to the body portion 24 is partially enlarged in diameter with the contact portion 126. Thereby, the fixed portion 25 is reinforced. The back side surface of the contact portion 126 is in surface contact with the first reflection sheet 22. Although the contact portion 126 is rectangular in a plan view, its specific shape may be changed as appropriate, for example, to a circle or ellipse. In the reflection sheets 22, 23 and the LED substrate 18, the position pressed by the contact portion 126 from the front side is the almost same as the position pressed by the engaging portion 25d from the back side in a plan view.

As described above, according to this embodiment, the contact portion 126 is connected to the fixed portion 25. With this configuration, as compared to the case where the contact portion is independent from the fixed portion 25, strength of the contact portion 126 and the fixed portion 25 can be increased. The contact portion 126 surrounds the fixed portion 25. The intensity of the contact portion 126 and the fixed portion 25 can be further increased.

Although the second embodiment of the present invention has been described, the present invention is not limited to this embodiment and for example, may include the following modification examples. In each of the following modification examples, the same members as those in the above-mentioned embodiment are given the same reference numerals and illustration and description thereof may be omitted.

First Modification Example of Second Embodiment

A first modification example of the second embodiment will be described with reference to FIG. 26. Here, contact portion 126-1 and a first reflection sheet 22-1 that have modified configuration are shown.

As shown in FIG. 26, the diameter of a communicating hole 22c-1 on the first reflection sheet 22-1 is extended in such a manner as to allow even insertion of the contact portion 126-1. That is, the communicating hole on the first reflection sheet 22-1 has a larger diameter than the communicating hole 23c on the second reflection sheet 23 and the through hole 18b on the LED substrate 18. The protruding dimension of the contact portion 126-1 from the body portion 24 is larger than that in the second embodiment by the thickness of the first reflection sheet 22-1. Accordingly, when the holding member 20 is attached to the chassis 14, the contact portion 126-1 is in contact with the edge of the communicating hole 23c on the second reflection sheet 23. Thereby, the pressing force from the contact portion 26 acts on only the second reflection sheet 23 and the LED substrate 18 and does not act on the first reflection sheet 22-1. Accordingly, the degree of flexibility in expansion or contraction of the first reflection sheet 22-1 due to thermal expansion or thermal contraction is improved further.

Second Modification Example of Second Embodiment

A second modification example of the second embodiment will be described with reference to FIG. 27. Here, a contact portion 126-2 and a second reflection sheet 23-2 that are modified from those in the first modification example are shown.

As shown in FIG. 27, the diameter of a communicating hole 23c-2 on the second reflection sheet 23-2 is enlarged in such a manner as to allow even insertion of the contact portion 126-2. That is, the diameter of the communicating hole 23c-2 on the second reflection sheet 23-2 is equal to that of the communicating hole 22c-1 on the first reflection sheet 22-1 and is larger than that of the through hole 18b on the LED substrate 18. The protruding dimension of the contact portion 126-2 from the body portion 24 is larger than that in the first modification example by the thickness of the second reflection sheet 23-2. Accordingly, when the holding member 20 is attached to the chassis 14, the contact portion 126-2 is in contact with the edge of the through hole 18b on the LED substrate 18. Thereby, the pressing force from the contact portion 126-2 acts on only the LED substrate 18 and does not act on the first reflection sheet 22-1 and the second reflection sheet 23-2. Accordingly, the degree of flexibility in expansion or contraction of the first reflection sheet 22-1 and the second reflection sheet 23-2 due to thermal expansion or thermal contraction is enhanced further.

Third Embodiment

Figure 29:
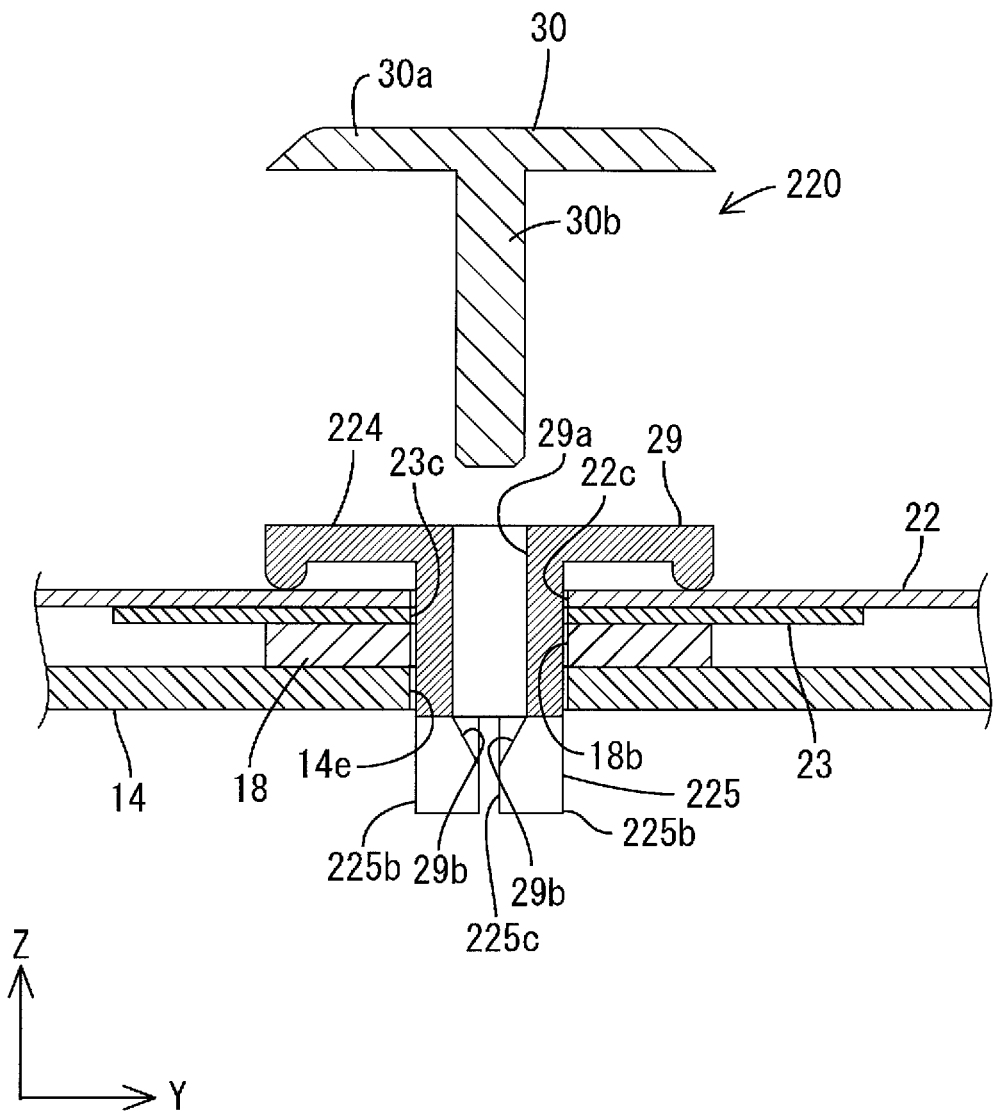
FIG. 29 is a sectional view showing the state where a first component of the holding member is attached to the chassis.
Figure 30:
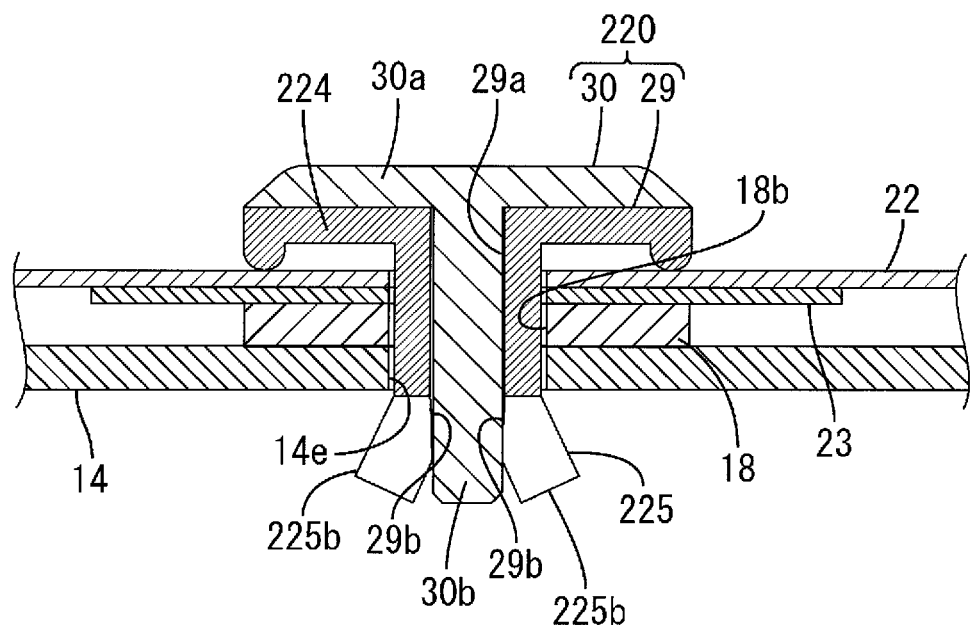
FIG. 30 is a sectional view showing the state where a second component is attached to the first component.

A third embodiment of the present invention will be described below with reference to FIGS. 28 to 30. In the third embodiment, a holding member 220 is modified in shape from that in the second embodiment. Overlapping description of the same configuration, actions and effects as those in the first and second embodiments is omitted.

Figure 28:
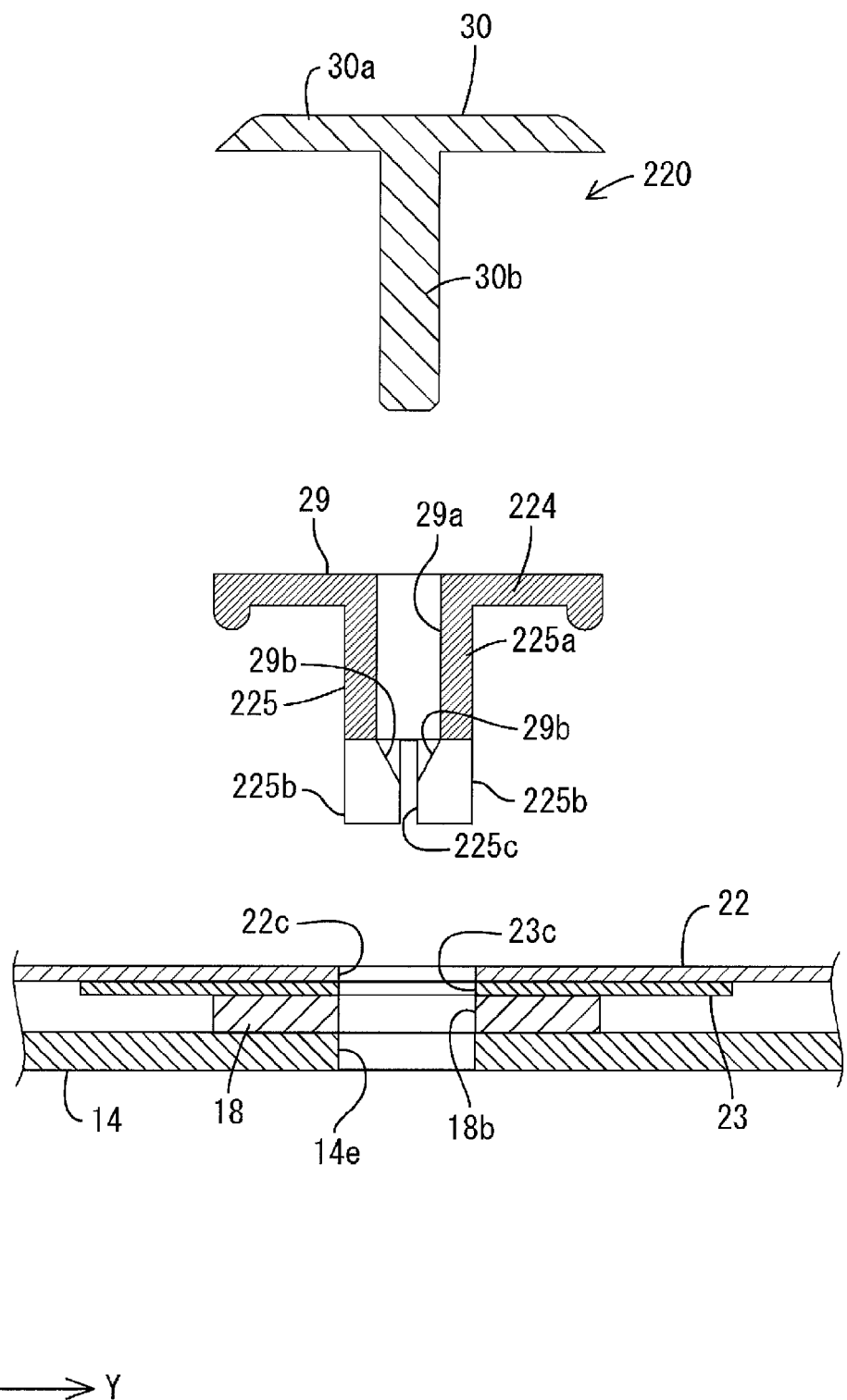
FIG. 28 is a sectional view showing the state where a holding member according to a third embodiment is attached to the chassis.

The holding member 220, as shown in FIG. 28, is configured of two components: a first component 29 including a body portion 224 and a fixed portion 225 and a second component 30 attachably and detachably assembled to the first component 29 from the front side. The first component 29 is provided with an attaching opening 29a for attaching the second component 30, which is opened on the front side. The attaching opening 29a passes through the body portion 224 of the first component 29, and has a depth over the entire length of a bottom portion 225a of the fixed portion 225. Accordingly, the attaching opening 29a is connected to a grooved portion 225c formed on the fixed portion 225. That is, the attaching opening 29a is also opened to the back side through the grooved portion 225c. The attaching opening 29a has a circular cross section. An inclined surface 29b facing the attaching opening 29a is provided on an inner surface of each elastic engaged portion 225b forming the fixed portion 225. The inclined surface 29b is arranged at a protruding bottom end of the elastic engaged portion 225b. The inclined surface 29b is gradually inclined inward from the protruding bottom end of the elastic engaged portion 225b toward the protruding front end, so that the protruding bottom end of the elastic engaged portion 225b becomes narrower toward the protruding front end side and becomes wider toward the protruding front end side. The diameter of a fixed portion 225 is substantially constant over the entire length, and is slightly smaller than each of the holes 14e, 18b, 22c and 23c on the reflection sheets 22, 23, LED substrate 18 and the chassis 14. Each elastic engaged portion 225b is not provided with the engaging portion 25d as shown in the first embodiment.

The second component 30 has a substantially T-shaped cross section, and includes a bottom portion 30a extending in parallel to the body portion 224 of the first component 29 and a shaft portion 30b protruding from the bottom portion 30a toward the back side. The bottom portion 30a is substantially circular in a plan view, and has the almost same dimension of the body portion 224 of the first component 29. The shaft portion 30b is shaped like a cylinder having a substantially constant diameter over the entire length, and has the protruding dimension from the bottom portion 30a, which is the almost same as the dimension of the first component 29 in the Z-axis direction. The shaft portion 30b has the diameter that is slightly smaller than the attaching opening 29a of the first component 29 and thus, can be inserted into or pulled out of the attaching opening 29a.

Subsequently, the operation of attaching the holding member 220 with the above-mentioned configuration to the chassis 14 will be described. First, as shown in FIG. 29, first, the first component 29 is attached to the chassis 14. At this time, the fixed portion 225 of the first component 29 is inserted into each of the holes 14e, 18b, 22c and 23c on the reflection sheets 22, 23, the LED substrate 18 and the chassis 14, respectively. In this state, the fixed portion 225 is not engaged with the chassis 14. Next, the second component 30 is attached to the first component 29 from the front side. When the shaft portion 30b of the second component 30 is inserted into the attaching opening 29a of the first component 29 from the front side and reaches a predetermined depth, a front end of the shaft portion 30b contacts the inclined surface 29b of each elastic engaged portion 225b. When the second component 30 is further inserted in this state, as shown in FIG. 30, the inclined surface 29b is pressed by the front end of the shaft portion 30b, and each elastic engaged portion 225b is elastically deformed along the inclination so as to extend outward. That is, each elastic engaged portion 225b is extended by the shaft portion 30b to be elastically deformed and is engaged with the edge of the attachment hole 14e. Each elastic engaged portion 225b is restricted from being elastically returned inward (deformed to be closed) by the shaft portion 30b arranged inside of the elastic engaged portion 225b. This can prevent the phenomenon that the holding member 220 is carelessly detached from the chassis 14. When each elastic engaged portion 225b is pressed by the shaft portion 30b, each elastic engaged portion 225b may be subjected to plastic deformation.

As described above, in this embodiment, the holding member 220 includes the body portion 224 that sandwiches the reflection sheets 22, 23 and the LED substrate 18 between the body portion 224 and the chassis 14 and the fixed portion 225 that protrudes from the body portion 224 toward the chassis 14 and is fixed to the chassis 14, the fixed portion 225 has the elastic engaged portion 225b that is elastically deformable and is engaged on the side opposite to the reflection sheets 22, 23 and the LED substrate 18 through the chassis 14, and the holding member 220 is constituted of the first component 29 having the body portion 224 and the fixed portion 225 and the second component 30 that is attached to the first component 29 and restricts elastic deformation of the elastic engaged portion 225b. With this configuration, when the second component 30 is attached to the first component 29 in the state where the first component 29 is attached to the chassis 14, elastic deformation of the elastic engaged portion 225b that is engaged on the side opposite to the reflection sheets 22, 23 and the LED substrate 18 through the chassis 14 is restricted. Thereby, the holding member 220 can be strongly prevented from being detached from the chassis 14.

Fourth Embodiment

A fourth embodiment of the present invention will be described with reference to FIG. 31 or FIG. 32. In the fourth embodiment, the second reflection sheet 23 in the first embodiment is omitted. Overlapping description of the same configuration, actions and effects as those in the first embodiment is omitted.

In this embodiment, the second reflection sheet 23 according to the first embodiment is omitted, and as shown in FIG. 31, a reflecting layer 318d in place of the second reflection sheet 23 is formed on the front side surface of an LED substrate 318. The reflecting layer 318d assumes a white color having excellent light reflectivity, and is formed, for example, by printing paste containing a metal oxide on the surface of the LED substrate 318. Screen printing and ink jet printing are preferable as printing means. Although the reflecting layer 318d can be formed on the almost all of the front side surface of the LED substrate 318, the reflecting layer 318d may be formed on a part opposite to the diffuser lenses 19 on the LED substrate 318. The reflecting layer 318d can reflect light returned from the diffuser lenses 19 toward the diffuser lenses 19 again. As shown in FIG. 32, only the first reflection sheet 22 is sandwiched between the body portion 24 of the holding member 20 and the LED substrate 318.

Fifth Embodiment

A fifth embodiment of the present invention will be described below with reference to FIG. 33. In the fifth embodiment, the diffuser lenses 19 and the second reflection sheet 23 in the first embodiment are omitted. Overlapping description of the same configuration, actions and effects as those in the first embodiment is omitted.

In this embodiment, since the diffuser lenses 19 and the second reflection sheet 23 in the first embodiment are omitted, light emitted from each of the LEDs 17, as shown in FIG. 33, directly reaches the optical member 15. A first reflection sheet 422 is provided with an opened LED insertion hole 422e that can pass each of the LEDs 17 therethrough (is smaller than the lens insertion hole 22b in the first embodiment) and can be placed directly on the LED substrate 18. In adopting this embodiment, since the region between the LEDs 17 is easy to be visually recognized as a dark place, in order to prevent uneven brightness, it is preferred that the alignment pitch of the LEDs 17 in the X-axis direction and the Y-axis direction is smaller than that in the first embodiment.

Other Embodiment

The present invention is not limited to the embodiments described in the above description and figures, and for example, following embodiments fall within the technical scope of the present invention.

(1) Also in embodiments other than each of the above-mentioned embodiments, specific shape of the contact portion can be changed as appropriate. For example, a cylindrical, prismatic, conical or pyramid contact portion, or a contact portion having an angular (triangular) and elliptic cross section also falls within the scope of the present invention. When the contact portion is cylindrical or prismatic, the contact portion is in surface contact with the extending member (each reflection sheet or the LED substrate), and when the contact portion is conical or pyramid, the top of the contact portion is in point contact with the extending member. Further, for example, the contact portion shaped like a straight line having a predetermined length in a plan view, an elliptic endless ring, a rectangular endless ring or a ring having an end (C-like) in a plan view also falls within the scope of the present invention.

(2) Although the contact portions located away from the fixed portion are provided at the outer edge of the body portion in the first embodiment (including each of the modification examples) and the third to fifth embodiments, the contact portions can be arranged at positions other than the outer edge of the body portion, specifically, between the outer edge of the body portion and the fixed portion. In this case, the contact portions can be arranged at both the outer edge of the body portion and the other position.

(3) Although the plurality of point contact portions are located at the body portion to be symmetrical in a plan view in the first embodiment, as a matter of course, the plurality of contact portions may be located at asymmetrical positions of the body portion.

(4) Although the four point contact portions in a plan view are provided at the body portion in the first embodiment, as a matter of course, the number of contact portions may be three or smaller or five or larger.

(5) Although the part of the body portion between the fixed portion and the contact portion has elasticity in the first embodiment (including each of the modification examples) and the third to fifth embodiments, the body portion does not necessarily have elasticity and the body portion that is hardly elastically deformed or is not elastically deformed at all also falls within the present invention. Even in this case, since positions where the pressing forces are applied from the front side and the back side from the extending member (each reflection sheet or the LED substrate) are shifted from each other in a plan view, concentration of stress on the extending member can be preferably mitigated and the effect of improving the degree of flexibility in expansion or contraction can be obtained.

(6) Contrary to (5) above, in order to impart elasticity to the part of the body portion between the fixed portion and the contact portion, for example, it may be configured such that flexure is facilitated and that, by increasing the protruding dimension of the contact portion from the body portion, the body portion can be elastically deformed even when no dimensional error occurs.

(7) Although the fixed portion is located at such a position as to be concentric with the body portion in each of the above-mentioned embodiments, the fixed portion located at such a position as to be eccentric with the body portion also falls within the present invention. For example, the fixed portion can be located at the outer edge of the body portion. In this case, in locating the contact portion at the outer edge of the body portion, it is preferred that the contact portion is located on a straight line connecting the center of the fixed portion to the center of the body portion, thereby ensuring the maximum distance between the contact portion and the fixed portion.

(8) Although the contact portion connected to the fixed portion surrounds the fixed portion in the second embodiment (including each of the modification examples), the contact portion connected to the fixed portion, which does not surround the fixed portion, that is, the contact portion connected to only a part of the bottom portion also falls within the present invention.

(9) As a matter of course, the configuration shown in the second and third modification examples of the first embodiment can be applied to the configuration described in the second to fifth embodiments.

(10) As in the same manner as (9) above, as a matter of course, the configuration shown in the first and second modification example of the second embodiment can be applied to the first embodiment. In such case, a hole that passes the contact portion therethrough, separately from a communicating hole that passes the fixed portion therethrough, may be formed on the first reflection sheet or the second reflection sheet.

(11) Also in embodiments other than each of the above-mentioned embodiments, the shape of the body portion of the holding member can be changed as appropriate. Specifically, the body portion shaped to be elliptic or quadrate (rectangular or square) in a plan view also falls within the scope of the present invention.

(12) Although the holding member is arranged between the adjacent LEDs on the LED substrate in each of the above-mentioned embodiments, the holding member located in a region overlapping the LED on the LED substrate in a plan view falls within the scope of the present invention. In this case, it is preferable to provide an insertion hole on the overlapping position of the holding member with the LED.

(13) Also in embodiments other than each of the above-mentioned embodiments, attachment position and the number of attached holding members with respect to each LED substrate can be changed as appropriate. Similarly, attachment position and the number of attached holding members with respect to chassis can be changed as appropriate.

(14) Although the plug-in type fixed portion is adopted as the attachment structure of the holding member to the chassis in each of the above-mentioned embodiments, slide-type may be adopted as the attachment structure. In an example of the slide-type attachment structure, by adopting a hook-type fixed portion, pushing the body portion toward the bottom plate of the chassis and then, sliding the body portion along the bottomplate, the hooked part of the fixed portion is engaged with the edge of the attachment hole.

(15) Although the fixed portion of the holding member is engaged passing through the chassis in each of the above-mentioned embodiments, the specific fixing method of the fixed portion to the chassis can be changed as appropriate. For example, configuration in which the attachment hole and the elastic engaged portion are omitted and a bottom part passing through the through hole of the LED substrate is fixedly attached to the inner wall surface of the chassis with the adhesive or the like falls within the scope of the present invention. In this case, means such as deposition and welding other than the adhesive can be adopted.

(16) Although the supporting portion and the body portion are located in the complex function-type holding member so as to be concentric with each other in each of the above-mentioned embodiments, the supporting portion located eccentric with the body portion also falls within the scope of the present invention. Further, arrangement in which the supporting portion and the fixed portion do not overlap each other in a plan view also falls within the scope of the present invention.

(17) Although the supporting portion of the complex function-type holding member is shaped like a tapered cone in each of the above-mentioned embodiments, for example, the supporting portion shaped like a tapered pyramid falls within the scope of the present invention. Further, the supporting portion is not necessarily tapered and the supporting portion shaped like a cylinder or prismatic column having a constant diameter also falls within the scope of the present invention.

(18) Although the supporting portion of the complex function-type holding member is in contact with the diffuser plate extending straight in the X-axis direction and the Y-axis direction in each of the above-mentioned embodiments, the supporting portion that is not in contact with the straight diffuser plate (specifically, the protruding front end of the supporting portion is located closer to the LED than the surface of the diffuser plate on the LED side) falls within the scope of the present invention. With such configuration, for example, even when the diffuser plate thermally expands due to change in the thermal environment in the backlight unit, the diffuser plate is allowed to be deformed so as to warp toward the LED in a clearance held between the diffuser plate and the supporting portion. Thereby, wrinkle or flexure is hard to occur in the diffuser plate and thus, uneven brightness is also hard to occur in illumination light emitted from the diffuser plate.

(19) Although the supporting portion of the complex function-type holding member is point in the plane of the optical member in each of the above-mentioned embodiments, a linear or sheet-like supporting portion in the plane of the optical member also falls within the scope of the present invention.

(20) Although the single function-type holding member and the complex function-type holding member are concurrently used in each of the above-mentioned embodiments, configuration using only the single function-type holding member and configuration using only the complex function-type holding member falls within the scope of the present invention. Further, in concurrently using the single function-type holding member and the complex function-type holding member, the ratio of these members can be changed as appropriate.

(21) Although the color of the surface of the holding member is white in each of the above-mentioned embodiments, the color of the surface of the holding member may be, for example, creamy white or silver. Further, the color of the surface can be set by coating the surface of the holding member with a paint of desired color.

(22) Although the reflection sheets are provided as the "extending members" in each of the above-mentioned embodiments, the configuration having no reflection sheet also falls within the present invention.

(23) Although the LED substrate is provided as the "extending member" in each of the above-mentioned embodiments, configuration having no LED substrate also falls within the present invention. In this case, a discharge lamp such as a cold cathode tube (linear light source) or a sheet-like light source such as an organic EL may be used as the light source.

(24) Although the reflection sheet and the LED substrate are used as the "extending member" in each of the above-mentioned embodiments, for example, when a sheet-like heat radiating member is interposed between the LED substrate and the chassis, the heat radiating member may be used as the "extending member".

(25) Although the five-mounted type, the six-mounted type and the eight-mounted type of LED substrates are combined as appropriate in each of the above-mentioned embodiments, an LED substrate that mounts the number of LEDs other than five, six and eight LEDs falls within the scope of the present invention.

(26) Although the LED that includes the LED chip emitting only blue light and emits white light by means of the phosphor is used in each of the above-mentioned embodiments, an LED that includes the LED chip emitting only ultraviolet light and emits white light by means of the phosphor falls within the scope of the present invention.

(27) Although the LED that includes the LED chip emitting only blue light and emits white light by means of the phosphor is used in each of the above-mentioned embodiments, an LED that has three types of LED chips emitting R, G, B, respectively, falls within the scope of the present invention. Moreover, an LED that has three types of LED chips emitting C (cyan), M (magenta), Y (yellow), respectively, also falls within the scope of the present invention.

(28) Although the LED that emits white light in each of the above-mentioned embodiments, an LED that emits red light, an LED that emits blue light and an LED that emits green light may be combined as appropriate.

(29) Although the LED is used as the light source in each of the above-mentioned embodiments, a point light source other than the LED also falls within the scope of the present invention.

(30) Although the diffuser lens diffusing light from the LED is used in the first to fourth embodiments, an optical lens other than the diffuser lens (for example, a collective lens) falls within the scope of the present invention.

(31) Also in embodiments other than each of the above-mentioned embodiments, screen size and aspect ratio of the liquid crystal display device can be changed as appropriate.

(32) Although the liquid crystal panel and the chassis are arranged in the longitudinally mounted state so that the short-side direction matches the vertical direction in each of the above-mentioned embodiments, configuration in which the liquid crystal panel and the chassis are arranged in the longitudinally mounted state so that the long-side direction matches the vertical direction also falls within the scope of the present invention.

(33) Although the TFT is used as the switching component of the liquid crystal display device in each of the above-mentioned embodiments, the present invention can also be applied to a liquid crystal display device using a switching component (for example, a thin film diode (TFD)) other than TFT and the monochrome liquid crystal display device other than the color liquid crystal display device.

(34) Although the liquid crystal display device using the liquid crystal panel as the display panel is illustrated in each of the above-mentioned embodiments, the present invention can be applied to a display device using the other type of display panel.

(35) Although the television receiver provided with a tuner is illustrated in each of the above-mentioned embodiments, the present invention can be applied to a display device having no tuner.

(36) Although the two types of holding members are distinguished as the "single function-type" and the "complex function-type" in each of the above-mentioned embodiments, the "single function-type" does not mean that the holding member has no function other than the function of holding the extending member. The terms "single function-type" and "complex function-type" are made on the basis of presence or absence of the function of supporting the optical member for convenience of explanation, and the "single function-type" holding member can have any function accompanying the above-mentioned holding function (e.g. a function of positioning with respect to the extending member) and other additional functions.

The invention claimed is:

1. A lighting device comprising:
a light source;
a chassis storing the light source therein;
an extending member extending an inner surface of the chassis; and
a holding member fixed to the chassis and holding the extending member to the chassis such that the extending member is sandwiched between the holding member and the chassis, the holding member including a contact portion protruding toward the extending member and in contact with the extending member; wherein
the holding member includes a body portion and a fixed portion, the body portion that holds the extending member with the chassis such that the extending member is sandwiched between the body portion and the chassis, the fixed portion that protrudes from the body portion toward the chassis and is fixed to the chassis;
the fixed portion has an elastic engaged portion that is elastically deformable and is engaged on the side opposite to the extending member through the chassis; and
the holding member includes a first component and a second component, the first component that includes the body portion and the fixed portion, the second component that is attached to the first component and restricts elastic deformation of the elastic engaged portion.

2. The lighting device according to claim 1, wherein: the contact portion is provided at the body portion.

3. The lighting device according to claim 2, wherein the contact portion is arranged in an area of the body portion away from the fixed portion.

4. The lighting device according to claim 3, wherein: the fixed portion is arranged at the center of the body portion;
the contact portion is arranged at an outer edge of the body portion.

5. The lighting device according to claim 3, wherein: the contact portion includes at least a pair of contact portions arranged on respective sides of the body portion with respect to the fixed portion.

6. The lighting device according to claim 5, wherein the contact portions are arranged symmetrically about the fixed portion.

7. The lighting device according to claim 3, wherein: the fixed portion is arranged at the center of the body portion; and
the contact portion has an annular shape so as to surround the fixed portion.

8. The lighting device according to claim 2, wherein the contact portion is connected to the fixed portion.

9. The lighting device according to claim 8, wherein the contact portion surrounds the fixed portion.

10. The lighting device according to claim 2, wherein the fixed portion is passed through the extending member and fixed to the chassis.

11. The lighting device according to claim 10, wherein the fixed portion passes through the extending member and the chassis, and is engaged with the chassis from the side opposite to the extending member.

12. The lighting device according to claim 2, further comprising an optical member arranged opposite the light source, wherein the body portion includes a supporting portion that protrudes toward the optical member and supports the optical member.

13. The lighting device according to claim 12, wherein the fixed portion and the supporting portion are arranged so as to overlap each other in a plan view.

14. The lighting device according to claim 13, wherein the fixed portion and the supporting portion are arranged concentrically with each other.

15. The lighting device according to claim 1, wherein the contact portion has a dot-like plan-view shape.

16. The lighting device according to claim 1, wherein the contact portion has a linear plan-view shape.

17. The lighting device according to claim 1, wherein the contact portion has a curved contact surface that is in contact with the extending member.

18. The lighting device according to claim 17, wherein the contact surface of the contact portion is a spherical surface.

19. The lighting device according to claim 1, wherein the extending member is a light source substrate with the light source.

20. The lighting device according to claim 19, wherein a plurality of light sources are arranged in parallel on the light source substrate.

21. The lighting device according to claim 20, wherein the holding member is arranged between the adjacent light sources.

22. The lighting device according to claim 1, wherein the extending member is a reflection member that reflects light from the light source.

23. The lighting device according to claim 1, wherein:
the extending member includes a light source substrate with the light source and a reflection member that reflects light from the light source; and
the light source substrate and the reflection member are arranged so as to overlap each other and sandwiched between the holding member and the chassis.

24. The lighting device according to claim 23, wherein the reflection member is arranged on the light source substrate on the side opposite to the chassis, the reflection member that has a light source insertion hole through which the light source is passed at a position overlapping the light source in a plan view.

25. The lighting device according to claim 24, further comprising a diffuser lens diffusing light from the light source and arranged on the light source substrate on the side opposite to the chassis so as to overlap the light source in a plan view.

26. The lighting device according to claim 25, wherein the reflection member includes a first reflection member and a second reflection member, the first reflection member that has the light source insertion hole through which the diffuser lens is passed, the second reflection member that is arranged between the light source substrate and the diffuser lens, is arranged so as to overlap the light source insertion hole of the first reflection member in a plan view, and reflects light toward the diffuser lens.

27. The lighting device according to claim 26, wherein the first reflection member and the second reflection member have configurations such that an edge of the light source insertion hole overlaps the second reflection member in a plan view.

28. The lighting device according to claim 1, further comprising a restricting member restricting positional relationship of the holding member with respect to the extending member such that a gap is provided between the holding member and the extending member is provided.

29. A display device comprising:
   the lighting device according to claim 1; and
   a display panel configured to provide display using light from the lighting device.

30. The display device according to claim 29, wherein the display panel is a liquid crystal panel including liquid crystals between substrates.

31. A television receiver comprising the display device according to claim 29.

* * * * *